(12) United States Patent
See et al.

(10) Patent No.: US 12,057,901 B2
(45) Date of Patent: Aug. 6, 2024

(54) RADIO ARCHITECTURE FOR SWITCHING AMONG TRANSMISSION PATHS

(71) Applicants: QUALCOMM INCORPORATED, San Diego, CA (US); Henriette C. Franck

(72) Inventors: Andrew Puayhoe See, San Diego, CA (US); David Maldonado, San Marcos, CA (US); Peter J. Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/839,921

(22) Filed: Jun. 14, 2022

(65) Prior Publication Data

US 2023/0403052 A1    Dec. 14, 2023

(51) Int. Cl.
*H04B 7/0456* (2017.01)
*H04B 1/04* (2006.01)
*G06K 19/07* (2006.01)

(52) U.S. Cl.
CPC ......... *H04B 7/0456* (2013.01); *H04B 1/0483* (2013.01); *G06K 19/0723* (2013.01); *H04B 2001/0408* (2013.01)

(58) Field of Classification Search
CPC ........ G06K 19/0723; H01Q 1/22; H01Q 1/24; H01Q 3/36; H01Q 9/04; H01Q 21/06; H01Q 21/24; H01Q 23/00; H03F 1/56; H03F 3/19; H03F 3/21; H03F 3/195; H04B 1/00; H04B 1/04; H04B 1/16; H04B 1/38; H04B 1/44; H04B 1/0483; H04B 3/46; H04B 7/06; H04B 7/0413; H04B 7/0456; H04B 17/21

USPC ....... 375/219, 229, 260, 262, 267, 295, 316; 455/78, 114.3, 126
See application file for complete search history.

(56) References Cited

U.S. PATENT DOCUMENTS 10,763,899 B1 * 9/2020 Cetinoneri ............. H03F 3/213
2010/0291888 A1 11/2010 Hadjichristos et al.
(Continued)

FOREIGN PATENT DOCUMENTS

WO    2013056261 A1    4/2013

OTHER PUBLICATIONS

International Search Report and Written Opinion—PCT/US2023/022868—ISA/EPO—dated Sep. 21, 2023.

*Primary Examiner* — Shawkat M Ali
(74) *Attorney, Agent, or Firm* — Smith Tempel Blaha LLC/Qualcomm Incorporated

(57) ABSTRACT

A system for signal processing includes a radio frequency integrated circuit (RFIC) having a plurality of available transmission paths, the RFIC configured to have at least a first communication signal on a first transmission path of the available transmission paths, a plurality of power amplifier/low noise amplifier (PA/LNA) modules selectively connected to the RFIC, each of the PA/LNA modules configured to connect to at least one respective antenna, and switch logic configured to connect the at least first communication signal to any of the plurality of PA/LNA modules prior to power amplification, while preventing the first communication signal from affecting or being affected by another communication signal on another of the plurality of available transmission paths.

14 Claims, 16 Drawing Sheets

(56) References Cited

U.S. PATENT DOCUMENTS

2012/0163500 A1* 6/2012 Omoto ................ H04B 1/0483
375/298
2022/0052439 A1* 2/2022 Kim ....................... H01Q 1/243
2022/0149887 A1* 5/2022 Cho ....................... H01Q 21/24

* cited by examiner

RADIO ARCHITECTURE FOR SWITCHING AMONG TRANSMISSION PATHS

FIELD

The present disclosure relates generally to electronics, and more specifically to wireless communication systems, and more particularly to wireless communication devices having multiple input and multiple output (MIMO) capability.

BACKGROUND

Wireless communication devices and technologies are becoming ever more prevalent, as are communication devices that operate at various ranges of frequencies, such as, for example, frequencies ranging from approximately 410 MHz to approximately 7125 MHz, referred to as New Radio (NR) sub-6 or sub-7 band. Communication devices that operate at millimeter-wave (mmW) frequencies of approximately 24250 MHz to approximately 52600 MHz or greater are also contemplated. Wireless communication devices generally transmit and/or receive communication signals. In a radio frequency (RF) transceiver, a communication signal is typically amplified and transmitted by a transmit section and a received communication signal is amplified and processed by a receive section. A communication device may include multiple transmitters, receivers and antennas and may be capable of communicating on multiple frequency bands simultaneously.

Some communication devices may also use what is referred to as a multiple input multiple output (MIMO) architecture. A MIMO architecture typically may use multiple transmitters, multiple receivers, and multiple antennas (or antenna elements) to allow communication on a variety of communication bands.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a system for signal processing, including a radio frequency integrated circuit (RFIC) having a plurality of available transmission paths, the RFIC configured to have at least a first communication signal on a first transmission path of the available transmission paths, a plurality of power amplifier/low noise amplifier (PA/LNA) modules selectively connected to the RFIC, each of the PA/LNA modules configured to connect to at least one respective antenna, and switch logic configured to connect the at least first communication signal to any of the plurality of PA/LNA modules prior to power amplification, while preventing the first communication signal from affecting or being affected by another communication signal on another of the plurality of available transmission paths.

Another aspect of the disclosure provides a method for signal processing, including directing at least a first communication signal on a first transmission path of a plurality of available transmission paths, selectively connecting a plurality of power amplifier/low noise amplifier (PA/LNA) modules to the plurality of available transmission paths, and selectively connecting the at least first communication signal to any of the plurality of PA/LNA modules prior to power amplification, while preventing the first communication signal from affecting or being affected by another communication signal on another of the plurality of available transmission paths.

Another aspect of the disclosure provides a device including means for directing at least a first communication signal on a first transmission path of a plurality of available transmission paths, means for selectively connecting a plurality of power amplifier/low noise amplifier (PA/LNA) modules to the plurality of available transmission paths and means for selectively connecting the at least first communication signal to any of the plurality of PA/LNA modules prior to power amplification, while preventing the first communication signal from affecting or being affected by another communication signal on another of the plurality of available transmission paths.

Another aspect of the disclosure provides a radio system architecture, including a modem, a radio frequency integrated circuit (RFIC) connected to the modem, and a switch logic associated with the RFIC, the switch logic configured to selectively connect at least a first communication signal in the RFIC to any of a plurality of available power amplifier/low noise amplifier (PA/LNA) modules prior to power amplification.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
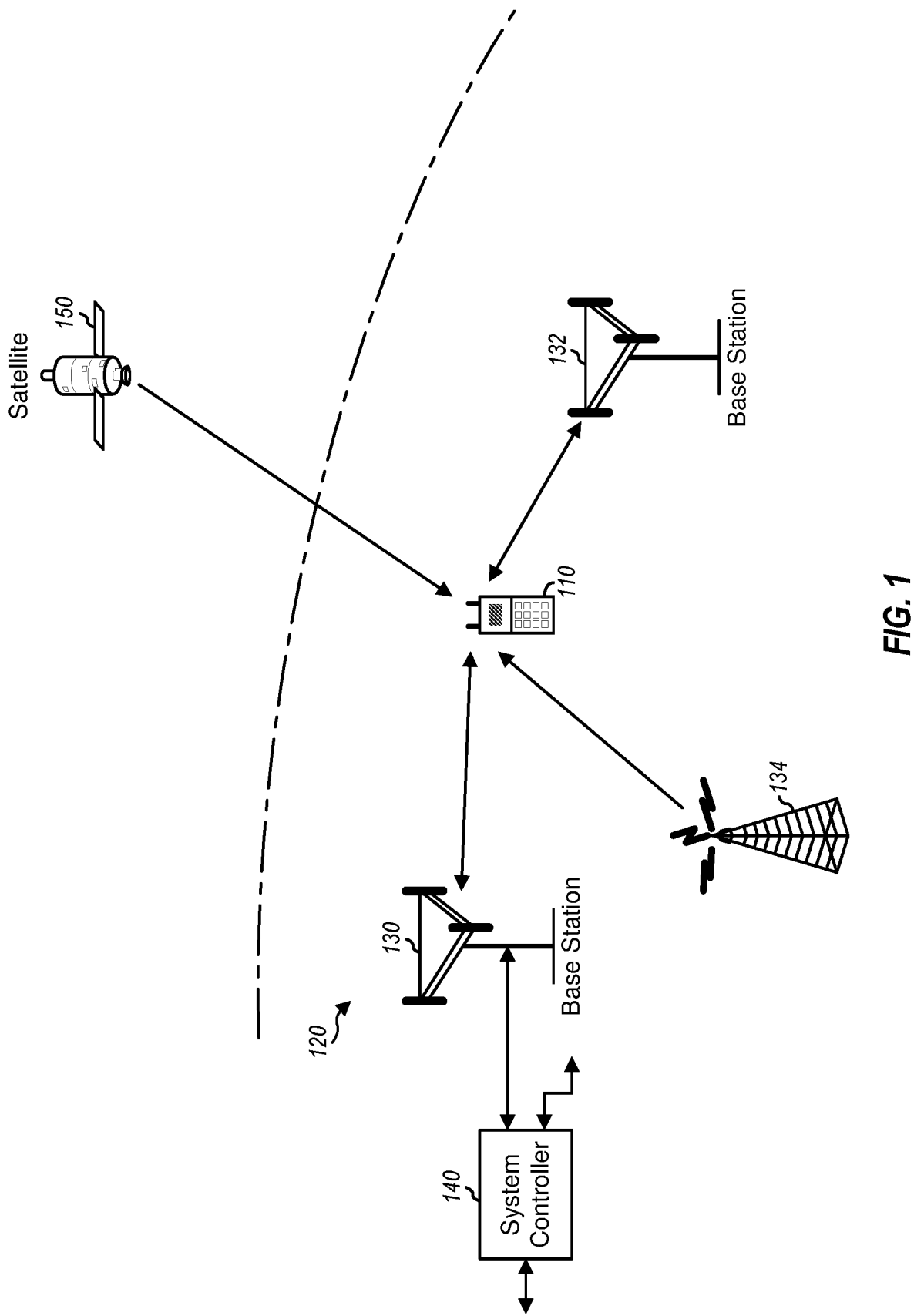
FIG. 1 is a diagram showing a wireless device communicating with a wireless communication system.

The word "exemplary" is used herein to mean "serving as an example, instance, or illustration." Any aspect described herein as "exemplary" is not necessarily to be construed as preferred or advantageous over other aspects.

A communication device may include both transmit (Tx) and receive (Rx) MIMO capability. For example, a 5G New Radio (NR) communication device may support multiple transmitters, multiple receivers and be capable of communication on multiple communication bands. In some examples, the communication device may also include carrier aggregation (CA) where it may simultaneously communicate on multiple communication bands. A 5G NR communication device may also support the transmission of a sounding reference signal (SRS) where a broadcast signal may be sent over all antennas on the communication device in a short period of time. Such communication may also support antenna switch diversity (ASDIV), where a communication signal may be routed from one circuit or module (for example, a radio frequency integrated circuit (RFIC)) to another circuit or module (for example, one or more front end modules (FEMs)) having one or more antennas. Similarly, a receive (Rx) MIMO capability may include a receive signal being routed from an antenna on one FEM to one or more RFICs. Such configurations may be referred to as higher order MIMO architectures and may include multiple transmitters and multiple receivers. Example transceiver MIMO architectures include one transmitter and four receivers (1T4R), one transmitter and six receivers (1T6R), one transmitter and eight receivers (1T8R), two transmitters and four receivers (2T4R), two transmitters and six receivers (2T6R), two transmitters and eight receivers (2T8R), and so on. Example higher order receiver MIMO architectures may include, for example, 6×6, 8×8 and so on.

Typically, the switching of these communication signals occurs after a power amplifier (PA) or after a power amplifier module (e.g., between the PA or PA module and an antenna) using one or more transmission lines. However, given the complexity of a modern communication device, such routing and switching is complex and transmission lines are prone to signal loss. Therefore, it would be desirable to implement a Tx and Rx MIMO communication architecture that reduces signal loss.

In an exemplary embodiment, a MIMO radio architecture may include the capability to switch multiple communication signals prior to a transmit signal being applied to a power amplifier (e.g., between a modem and the PA).

In an exemplary embodiment, switching a communication signal prior to a transmit signal being applied to a power amplifier results in switching a significantly smaller signal, thus minimizing loss.

In an exemplary embodiment, switching a communication signal prior to a transmit signal being applied to a PA may eliminate costly and lossy transmission lines that would otherwise be used to switch a signal after the PA.

In an exemplary embodiment, a MIMO radio architecture may include switches located in or integrated with a RFIC or in a PA module.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS)), etc). Wireless device 110 may support one or more radio technologies for wireless communication such as LTE, WCDMA, CDMA 1X, EVDO, TD-SCDMA, GSM, 802.11, 5G, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
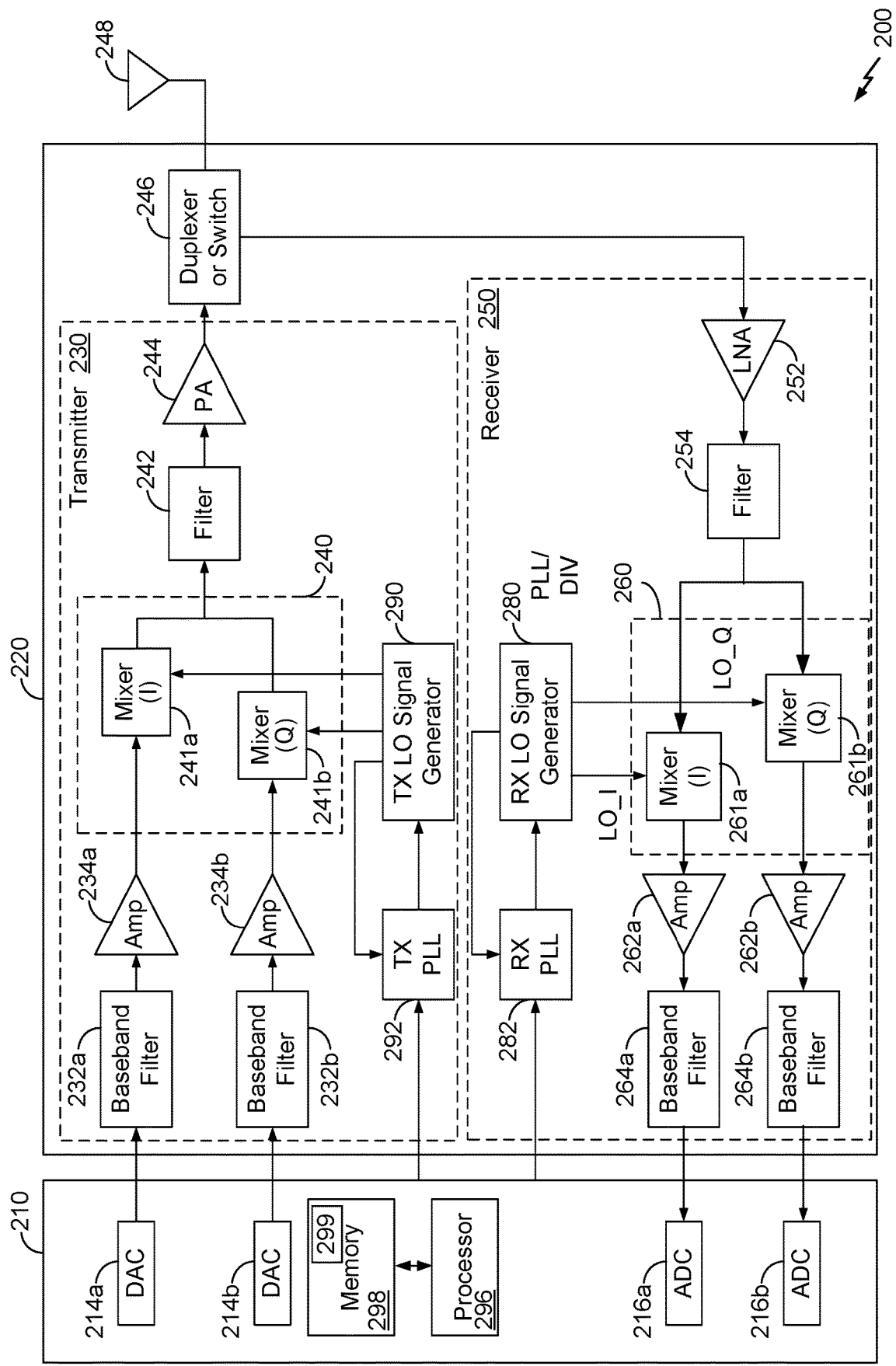
FIG. 2A is a block diagram showing a wireless device in which exemplary techniques of the present disclosure may be implemented.

FIG. 2A is a block diagram showing a wireless device 200 in which exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The processor 296 and the memory 298 may cooperate to control, configure, program, or otherwise fully or partially control some or all of the operation of the embodiments of the systems and methods described herein.

The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion. Amplifiers (Amp) 234a and 234b amplify the signals from baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal may be routed through a duplexer or switch 246 and transmitted via an antenna 248. While examples discussed herein utilize I and Q signals, those of skill in the art will understand that components of the transceiver may be configured to utilize polar modulation.

In the receive path, antenna 248 receives communication signals and provides a received RF signal, which may be routed through duplexer or switch 246 and provided to a low noise amplifier (LNA) 252. The duplexer 246 is designed to operate with a specific RX-to-TX duplexer frequency separation, such that RX signals are isolated from TX signals. The received RF signal is amplified by LNA 252 and filtered by a filter 254 to obtain a desired RF input signal.

Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., low-pass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the PA 244 and LNA 252 (and filter 242 and filter 254 in some examples) may be implemented separately from other components in the transmitter 230 and receiver 250, for example on a millimeter wave integrated circuit. An example super-heterodyne architecture is illustrated in FIG. 2B.

Figure 2B:
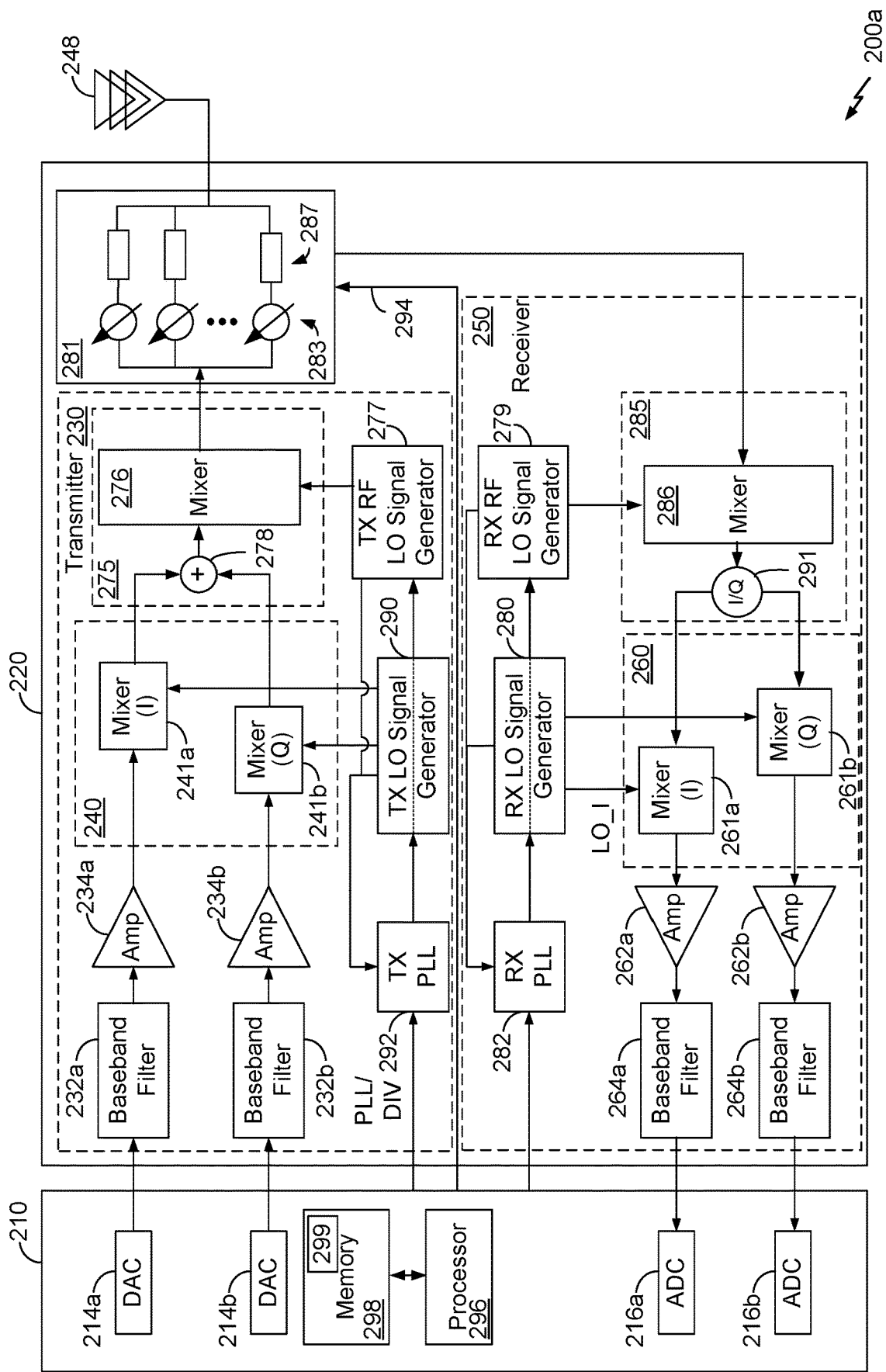
FIG. 2B is a block diagram showing a wireless device in which exemplary techniques of the present disclosure may be implemented.

FIG. 2B is a block diagram showing a wireless device in which exemplary techniques of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and/or power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B. While certain example frequencies are described herein, other implementations are possible. For example, signals having a frequency above about 20 GHz (e.g., having a mmW frequency) may be transmitted and/or received using a direct conversion architecture. In such embodiments, for example, a phased array may be implemented in the direct conversion architecture.

Figure 3A:
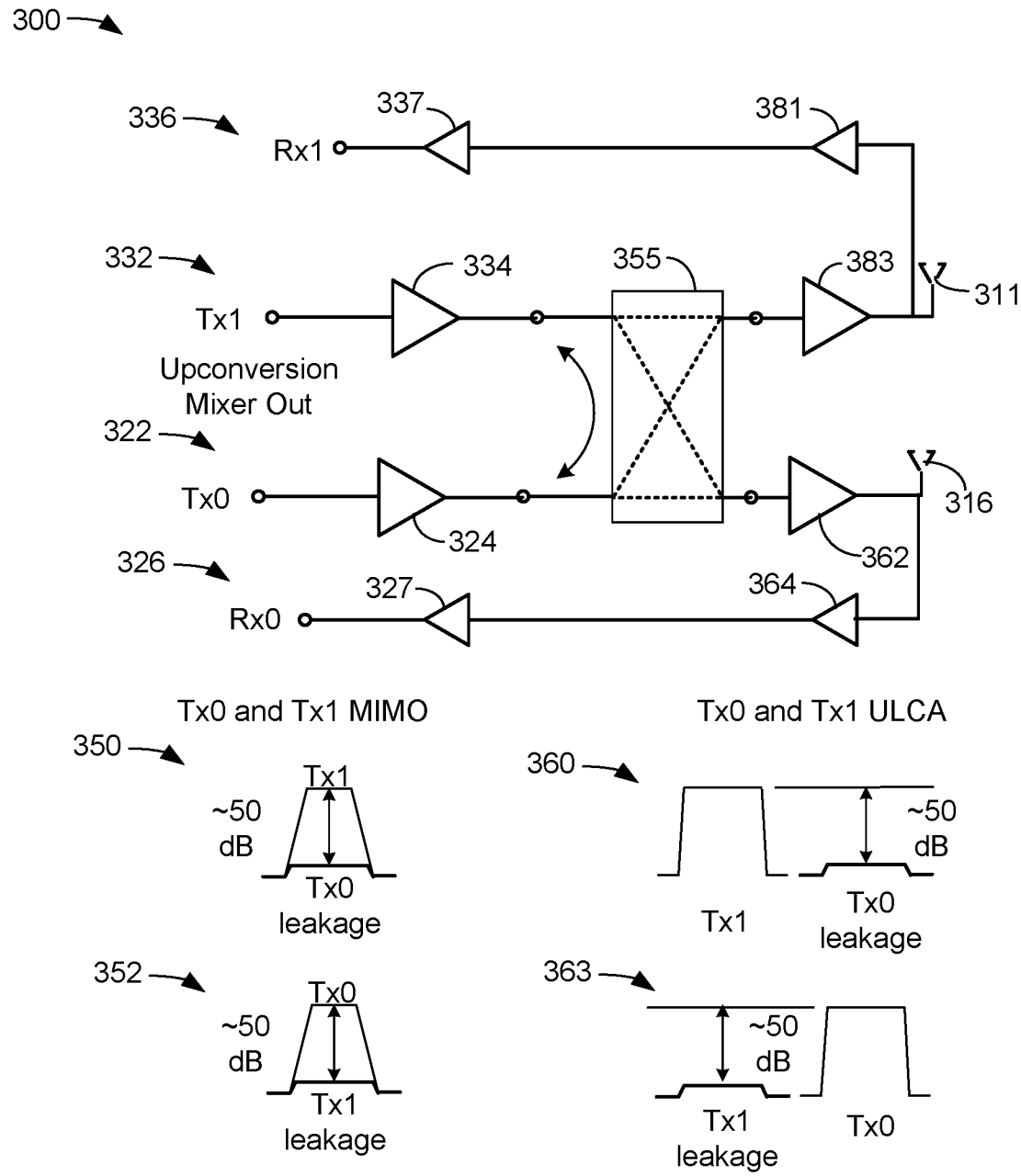
FIG. 3A is a block diagram showing isolation between communication paths.

FIG. 3A is a block diagram showing isolation between communication paths. A communication system 300 may include exemplary transmit communication paths 322 and 332, where communication path 322 may be referred to as Tx0 and communication path 332 may be referred to as Tx1. In an exemplary embodiment, the transmit communication path 322 and the transmit communication path 332 may also each be referred to as transmit path and may comprise a transmit path that extends from a modem to one or more of a digital to analog converter (DAC), a transceiver, one or more PA/LNA modules and at least one antenna. The communication system 300 may also include exemplary receive communication paths 326 and 336, where communication path 326 may be referred to as Rx0 and communication path 336 may be referred to as Rx1. For purposes of illustration only, only a portion of each communication path is shown in FIG. 3A. In an exemplary embodiment, communication path 322 may include a driver amplifier 324, a power amplifier 362 and an antenna 316. In an exemplary embodiment, communication path 332 may include a driver amplifier 334, a power amplifier 383 and an antenna 311. In an exemplary embodiment, communication path 326 may include a low noise amplifier (LNA) 364, a receive amplifier 327 and the antenna 316. In an exemplary embodiment, communication path 336 may include an LNA 381, a receive amplifier 337 and the antenna 311. In an exemplary embodiment, the driver amplifier 324 and the driver amplifier 334 may receive the output of an upconversion mixer (not shown).

In an exemplary embodiment, a switch logic 355 may comprise part of both communication paths 322 and 332. Other elements that are included in each communication path include filters, mixers, local oscillator (LO) signal generators, etc., are omitted from FIG. 3A for ease of illustration. In an exemplary embodiment, the switch logic 355 may comprise one or more switches and/or switch logic configured to switch signals between and among communication paths 322 and 332. In an exemplary embodiment, the switch logic 355, and the other switch logic and switches described herein may be controlled by the data processor 210 or another controller.

Two exemplary implementation examples of the communication system 300 where it may be desirable to provide electrical isolation between communication path 322 and communication path 332 may comprise a transmit MIMO implementation and an uplink carrier aggregation (ULCA) implementation. In an exemplary embodiment, it may be desirable to provide sufficient isolation between communication paths to prevent a signal on one communication path from affecting or interfering with a signal on another communication path. In some embodiments, it may be desirable to provide approximately 30 dB to approximately 50 dB of isolation between communication path 322 and communication path 332. In an exemplary embodiment where the switch logic 355 may route communication signals from the driver amplifier 324 to either of the power amplifiers 362 or 383; or where the switch logic 355 may route communication signals from the driver amplifier 334 to either of the power amplifiers 362 or 383, the switch logic 355 should be able to provide the mentioned isolation, which may be approximately 30 dB to approximately 50 dB isolation. The switch logic 355 can be implemented prior to the power amplifier 362 and power amplifier 383, i.e., after the driver amplifier (324, 334) or after a mixer (not shown in FIG. 3A) or before a mixer (not shown in FIG. 3A) at the mixer inputs (e.g., either or both of the baseband inputs and/or the local oscillator (LO) inputs). Although approximately 30 dB to approximately 50 dB isolation is mentioned herein, other values of isolation are contemplated based on implementation.

The graphs 350 and 352 show an example of isolation being provided between communication path 322 and 332 in a MIMO implementation where the signals in the communication path 322 (Tx0) and in the communication path 332 (Tx1) occur at the same frequency, but may contain different information, i.e., contain different data streams.

The graphs 360 and 363 show an example of isolation being provided between communication path 322 and 332 in an ULCA implementation where the signals in the communication path 322 (Tx0) and in the communication path 332 (Tx1) occur at different frequencies. In either a Tx MIMO implementation or in an ULCA implementation, it is desirable to prevent signal energy in the communication paths 322 and 332 from interfering with each other.

Figure 3B:
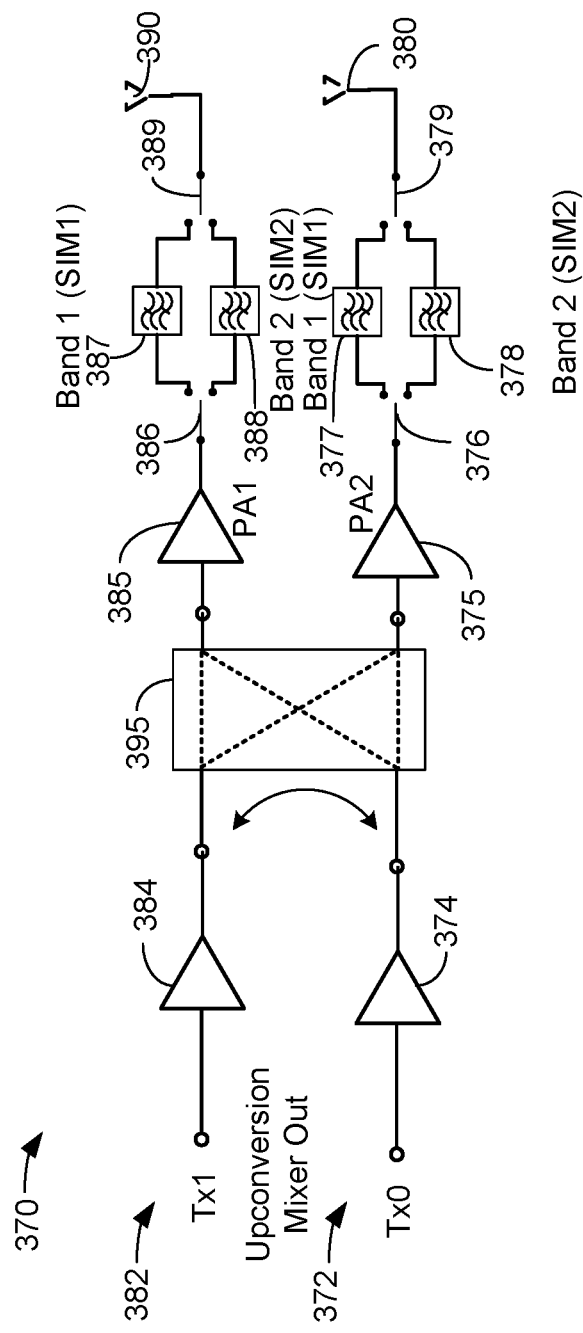
FIG. 3B is a block diagram showing an alternative exemplary embodiment of isolation between communication paths for multiple subscriber identity module (MSIM) operation.

FIG. 3B is a block diagram showing an alternative exemplary embodiment of isolation between communication paths for multiple subscriber identity module (MSIM) operation. A communication system 370 may be configured for MSIM operation in a dual subscription dual active (DSDA) communication system in which a single communication device may be capable of communicating on two separate networks. The communication system 370 may include exemplary transmit communication paths 372 and 382, where communication path 372 may be referred to as Tx0 and communication path 382 may be referred to as Tx1. In an exemplary embodiment, receive communication paths are omitted from FIG. 3B for simplicity of illustration.

In an exemplary embodiment, the transmit communication path 372 and the transmit communication path 382 may also each be referred to as transmit path and may comprise a transmit path that extends from a modem to one or more of a digital to analog converter (DAC), a transceiver, one or more PA/LNA modules and at least one antenna. For purposes of illustration only, only a portion of each communication path is shown in FIG. 3B. In an exemplary embodiment, communication path 372 may include a driver amplifier 374, a power amplifier 375, switch 376, filter 377, filter 378, switch 379 and an antenna 380. In an exemplary embodiment, communication path 382 may include a driver amplifier 384, a power amplifier 385, switch 386, filter 387, filter 388, switch 389 and an antenna 390. In an exemplary embodiment, the switches 376, 379, 386 and 389 may be used for RF band selection, and in this exemplary embodiment may be used for MSIM, DSDA.

In an exemplary embodiment, the filter 377 may be configured for operation on a first band and a first SIM (band 1 SIM 1), the filter 378 may be configured for operation on a second band and a second SIM (band 2 SIM 2). In an exemplary embodiment, the filter 387 may be configured for operation on the first band and the first SIM (band 1 SIM 1), the filter 388 may be configured for operation on the second band and the second SIM (band 2 SIM 2).

In an exemplary embodiment, the switch 376 may be configured to switch the output of the PA 375 to either the filter 377 or the filter 378 and the switch 379 may be configured to switch the antenna 380 between the filter 377 and the filter 378.

In an exemplary embodiment, the switch 386 may be configured to switch the output of the PA 385 to either the filter 387 or the filter 388 and the switch 389 may be configured to switch the antenna 390 between the filter 387 and the filter 388.

In an exemplary embodiment, a switch logic 395 may comprise part of both communication paths 372 and 382. Other elements that are included in each communication path include filters, mixers, local oscillator (LO) signal generators, etc., are omitted from FIG. 3B for ease of illustration. In an exemplary embodiment, the switch logic 395 may comprise one or more switches and/or logic configured to switch signals between and among communication paths 372 and 382.

The communication system 370 is an example of transmit path sharing in a MSIM DSDA communication environment. In an exemplary embodiment, only one PA (PA 375 or PA 385) may be active between SIM1 and SIM2 to avoid interference because the frequency of operation for SIM1 may be close to the frequency of operation for SIM2. For example, SIM1 and SIM2 may be active on band n78, so only PA 375 or PA 385 may transmit at a given time to minimize interference. However, the switch logic 395 can be used when performing an SRS or when employing TX ASDIV between the antennas 380 and 390, while maintaining a low loss by eliminating all other switches but the RF switches 376, 379, 386 and 389. The SIM1 and the SIM2 may operate on frequency division duplexing (FDD) or time division duplexing (TDD) systems.

Figure 4:
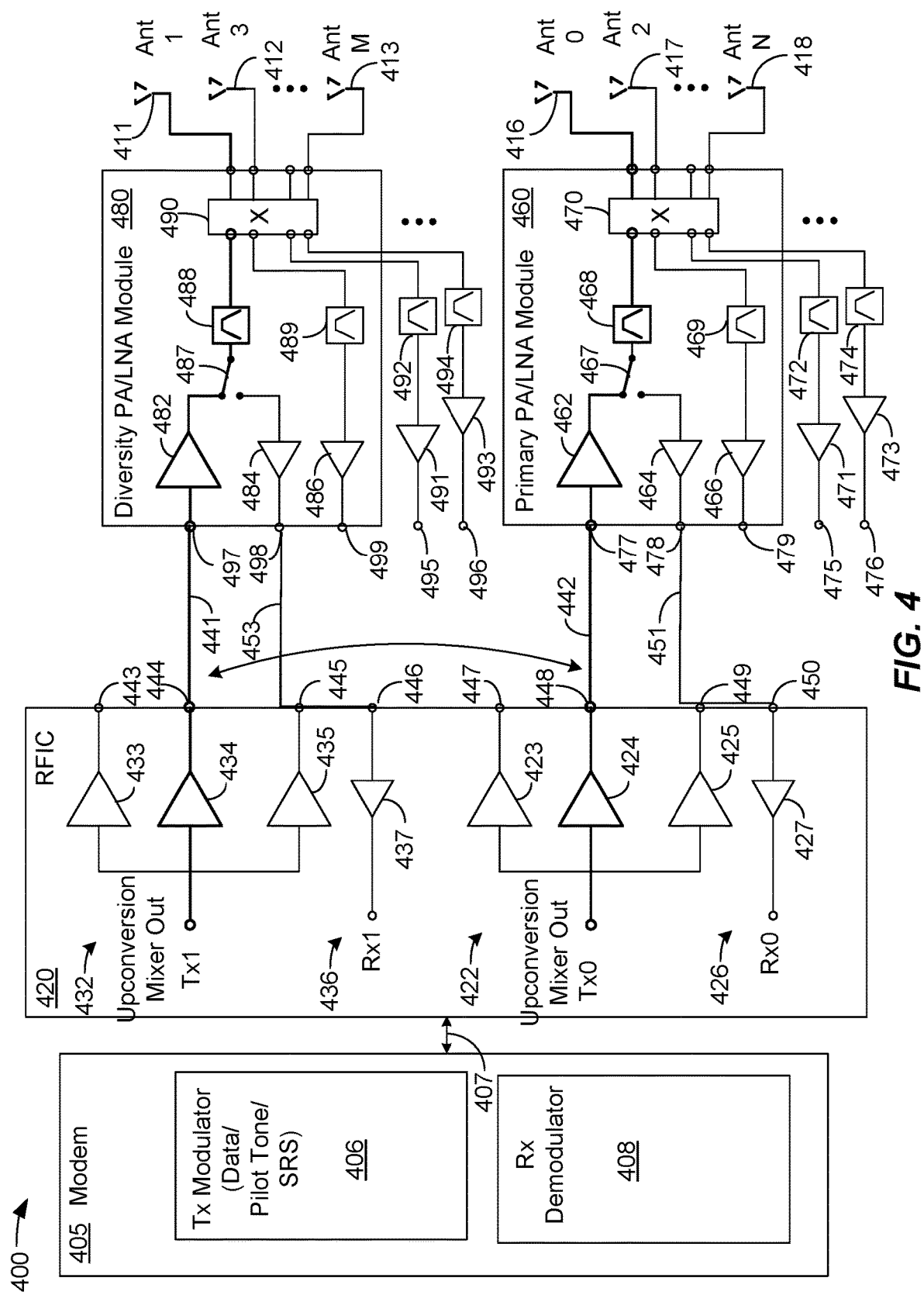
FIG. 4 is a block diagram showing an exemplary embodiment of a portion of a communication device configured for MIMO operation.

FIG. 4 is a block diagram showing an exemplary embodiment of a portion of a communication device 400 configured for MIMO operation. In an exemplary embodiment, the communication device 400 may comprise a modem 405 (which may be implemented by the data processor 210), a radio frequency integrated circuit (RFIC) that may comprise some or all of a radio frequency transceiver 420 (which may be implemented by the transceiver 220 or a portion thereof), a primary power amplifier/low noise amplifier (PA/LNA) module 460 and a diversity PA/LNA module 480 (one or both of which may be implemented in whole or in part by the PA 244, LNA 252, components of the phased array elements 287, and/or other components). In an exemplary embodiment, a PA/LNA module may also be referred to as a front end module (FEM).

In an exemplary embodiment, the modem 405, the RFIC 420, the primary PA/LNA module 460 and the diversity PA/LNA module 480 may be configured to operate on one or more communication bands and may be configured for MIMO operation. In an exemplary embodiment, the primary PA/LNA module 460 and the diversity PA/LNA module 480 may be examples of the PA 244 and the duplexer or switch 246 of FIG. 2A.

In an exemplary embodiment, the modem 405 may comprise a transmit (Tx) modulator 406 and a receive (Rx)/demodulator 408. In an exemplary embodiment, the Tx modulator 406 may be configured to generate communication (data) signals, pilot signals, and in some embodiments, can be configured to generate a sounding reference signal (SRS). An SRS is a signal that may be periodically transmitted over all available antennas to allow a base station (BS) with which the communication device 400 is in communication to perform channel estimation and other channel establishment and channel maintenance operations. The modem 405 may be connected to the RFIC 420 over connection 407. Connection 407 may be one or more (e.g., bi-directional) connections carrying in-phase (I) and quadrature (Q) baseband communication signals.

In an exemplary embodiment, the RFIC 420 may comprise exemplary transmit path 422, exemplary receive path 426, exemplary transmit path 432 and exemplary receive path 436. Although omitted for clarity, the exemplary transmit path 422, exemplary receive path 426, exemplary transmit path 432 and exemplary receive path 436 may be connected to the connection 407 and the modem 405.

In an exemplary embodiment, the transmit path 422 (Tx0) may comprise driver amplifiers 423, 424 and 425; and receive path 426 (Rx0) may comprise Rx amplifier 427. In an exemplary embodiment, the transmit path 432 (Tx1) may comprise driver amplifiers 433, 434 and 435; and receive path 436 (Rx1) may comprise Rx amplifier 437. In an exemplary embodiment, each transmit path 422 and 432 is shown in a simplified manner, where the functions of a filter, a mixer, an upconverter, a local oscillator (LO), all known to those having ordinary skill in the art, are embodied in respective driver amplifiers 423, 424, 425, 433, 434 and 435. Similarly, each receive path 426 and 436 is shown in a simplified manner, where the functions of a filter, a mixer, a downconverter, a local oscillator (LO), all known to those having ordinary skill in the art, are embodied in respective receive amplifiers 427 and 437.

In an exemplary embodiment, an output of the driver amplifier 423 may be provided to port 447, an output of the driver amplifier 424 may be provided to port 448, an output of the driver amplifier 425 may be provided to port 449, an output of the driver amplifier 433 may be provided to port 443, an output of the driver amplifier 434 may be provided to port 444, and an output of the driver amplifier 435 may be provided to port 445.

In an exemplary embodiment, an input to the receive amplifier 427 may be provided from port 450 over connection 451 and an input to the receive amplifier 437 may be provided from port 446 over connection 453.

In an exemplary embodiment, the PA/LNA module 460 may comprise a PA 462, a switch 467, a transmit filter 468, receive amplifiers 464 and 466, a receive filter 469 and a switch 470. The receive amplifiers 464 and 466 may be referred to as low noise amplifiers (LNAs). The PA 462 may be connected to a port 477, the LNA 464 may be connected to a port 478 and the LNA 466 may be connected to a port 479. The switch 470 may also be referred to as an antenna switch, which may be configured to provide antenna switch diversity. The switch 470 may be connected to antennas 416 (Ant0), 417 (Ant2) and 418 (AntN). Additional receive filters 472 and 474, and additional LNAs 471 and 473 are also illustrated to indicate that additional receivers may also be included in the communication device 400 to provide Rx MIMO operation. The LNA 471 is connected to a port 475 and the LNA 473 is connected to a port 476. In an exemplary embodiment, the additional receive filters 472 and 474, and additional LNAs 471 and 473 may be discrete components as shown in FIG. 4, or may be located in the PA/LNA module 460 or in another PA/LNA module similar to the PA/LNA module 460.

In an exemplary embodiment, the PA/LNA module 480 may comprise a PA 482, a switch 487, a transmit filter 488, receive amplifiers 484 and 486, a receive filter 489 and a switch 490. The receive amplifiers 484 and 486 may be referred to as low noise amplifiers (LNAs). The PA 482 may be connected to a port 497, the LNA 484 may be connected to a port 498 and the LNA 486 may be connected to a port 499. The switch 490 may also be referred to as an antenna switch, which may be configured to provide antenna switch diversity. The switch 490 may be connected to antennas 411 (Ant1), 412 (Ant3) and 413 (AntM). Additional receive filters 492 and 494, and additional LNAs 491 and 493 are also illustrated to indicate that additional receivers may also be included in the communication device 400 in a receive MIMO architecture. The LNA 491 is connected to a port 495 and the LNA 493 is connected to a port 496. In an exemplary embodiment, the additional receive filters 492 and 494, and additional LNAs 491 and 493 may be discrete components as shown in FIG. 4, or may be located in the PA/LNA module 480 or in another PA/LNA module similar to the PA/LNA module 480. The example shown in FIG. 4 comprises an architecture where it is desirable to achieve sufficient electrical isolation between transmit path 422 (Tx0) and transmit path 432 (Tx1) such that a signal on transmit path 422 (Tx0) does not affect a signal on transmit path 432 (Tx1) and a signal on transmit path 432 (Tx1) does not affect a signal on transmit path 422 (Tx0).

In an exemplary embodiment, the driver amplifier 424 is connected to the PA 462 over connection 442. In an exemplary embodiment, the driver amplifier 434 is connected to the PA 482 over connection 441.

In an exemplary embodiment, the ports 443, 445, 447 and 449 are shown as not being connected to a PA/LNA module for simplicity of illustration. Depending on implementation, the ports 443, 445, 447 and 449 could be connected to PA/LNA modules similar to PA/LNA modules 460 and 480.

In an exemplary embodiment, although shown as not being connected to the RFIC 420, the ports 479, 475 and 476 would be connected to other receive amplifiers (not shown) on the RFIC 420; and although shown as not being connected to the RFIC 420, the ports 499, 495 and 496 would be connected to other receive amplifiers (not shown) on the RFIC 420.

In an exemplary embodiment where the driver amplifier 424 is connected to the PA 462, and the driver amplifier 434 is connected to the PA 482, it is desirable to maintain electrical isolation between the port 444 and the port 448 (and between the port 497 and the port 477) to minimize the effect that a signal on connection 442 (Tx0) would have on a signal on connection 441 (Tx1), and to minimize the effect that a signal on connection 441 (Tx1) would have on a signal on connection 442 (Tx0). While the amount of isolation desired between the port 444 and the port 448 (and between the port 497 and the port 477) may vary based on implementation details, preferably, approximately 30 dB to approximately 50 dB or more isolation is achieved in the example of FIG. 4 because the Tx0 signal traverses the connection 442 and is processed by the primary PA/LNA module 460 and the Tx1 signal traverses the connection 441 and is processed by the diversity PA/LNA module 480. Lack of sufficient isolation between the ports 444 and 448 may lead to degraded error vector magnitude (EVM), and unwanted intermodulation (IM) products. However, while providing the desired isolation, in the example shown in FIG. 4 there is not a way to provide the Tx0 signal to the diversity PA/LNA module 480, and similarly, there is not a way to provide the Tx1 signal to the primary PA/LNA module 460 without the use of costly and lossy transmission lines between the primary PA/LNA module 460 and the diversity PA/LNA module 480, thereby limiting transmit MIMO capability.

Figure 5:
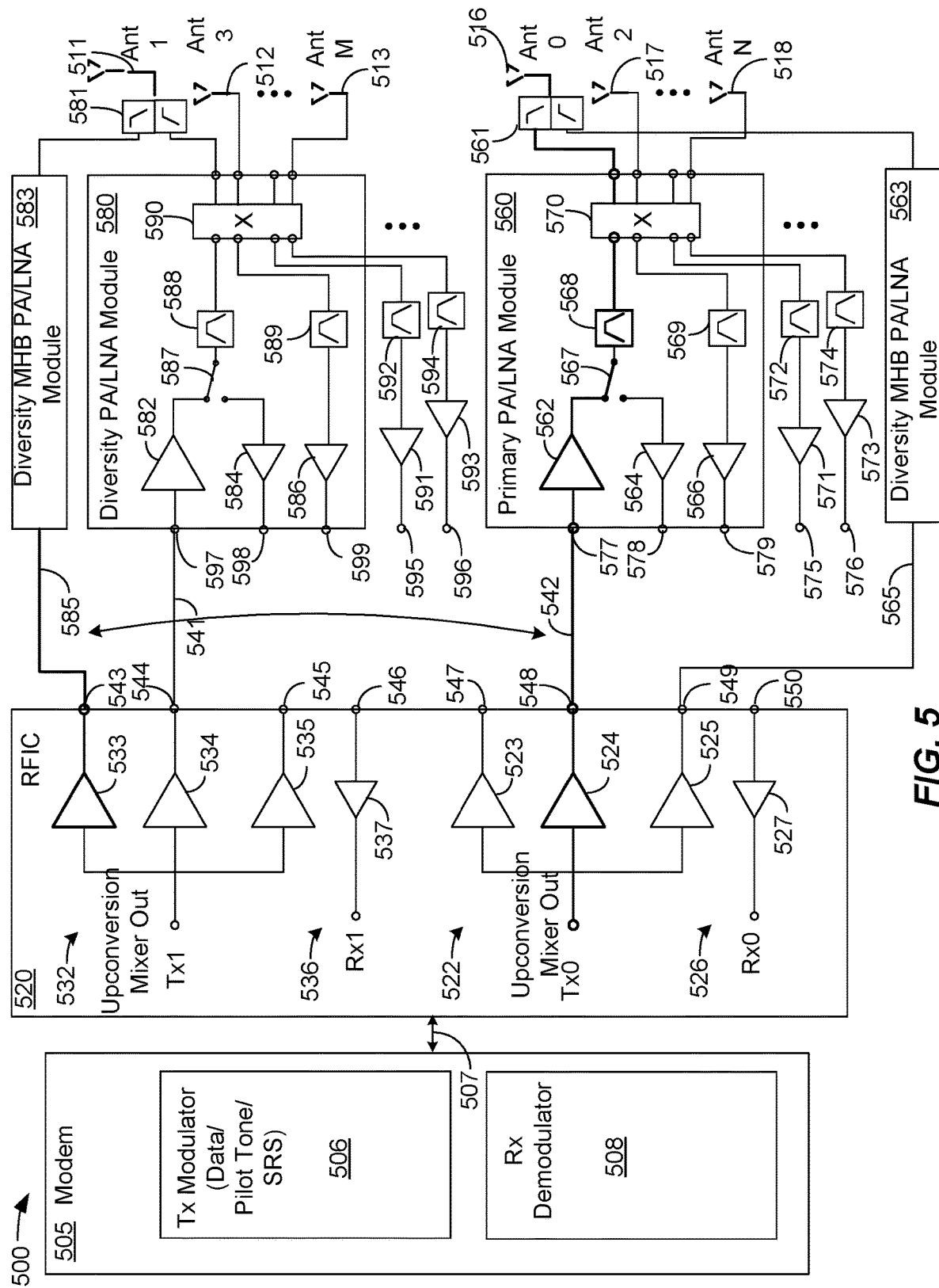
FIG. 5 is a block diagram showing an exemplary embodiment of a portion of a communication device configured for ULCA operation.

FIG. 5 is a block diagram showing an exemplary embodiment of a portion of a communication device 500 configured for unlicensed communication. Elements in FIG. 5 that are similar to elements in FIG. 4 will be numbered using the notation 5XX, where an element labeled 5XX in FIG. 5 is similar to an element labeled 4XX in FIG. 4.

In an exemplary embodiment, the communication device 500 may comprise a modem 505, an RFIC 520 a primary power amplifier/low noise amplifier (PA/LNA) module 560 and a diversity PA/LNA module 580. In an exemplary embodiment, additional diversity PA/LNA modules 563 and 583 may also be included. In an exemplary embodiment, the diversity PA/LNA modules 563 and 583 may be configured for mid-high band (MHB) operation. Although detail is omitted for ease of illustration, the diversity PA/LNA module 563 and the diversity PA/LNA module 583 may be similar to the diversity PA/LNA module 580. The diversity PA/LNA module 563 may be connected to the driver amplifier 525 and port 549 over connection 565. The diversity PA/LNA module 583 may be connected to the driver amplifier 553 and port 543 over connection 585.

The example in FIG. 5 shows an example of a communication device 500 configured for uplink carrier aggregation (ULCA) where a signal from transmit path 522 (Tx0) is transmitted at a first frequency via port 548, connection 542 and PA 562 using the primary PA/LNA module 560, while a signal from transmit path 532 (Tx1) may be transmitted at a second frequency via port 543 and connection 585 using the diversity PA/LNA module 583. In this example, it is desirable to have at least approximately 30 dB to approximately 50 dB isolation between port 548 and port 543 so that the signal on port 548 and connection 542 does not interfere with a signal at port 543, and so that a signal on port 543 does not interfere with a signal at port 548. In the example shown in FIG. 5, lack of sufficient isolation between the ports 548 and 543 may lead to degraded error vector magnitude (EVM), and unwanted intermodulation (IM) products.

In the example shown in FIG. 5, a diplexer 581 may be connected to the antenna 511 (Ant 1) to allow sharing of the antenna 511 (Ant 1) to support carrier aggregation (CA) implementations and Tx sounding reference signal carrier switching. Similarly, a diplexer 561 may be connected to the antenna 516 (Ant0) to allow sharing of the antenna 516 (Ant0) to support carrier aggregation (CA) implementations and Tx sounding reference signal carrier switching.

Figure 6:
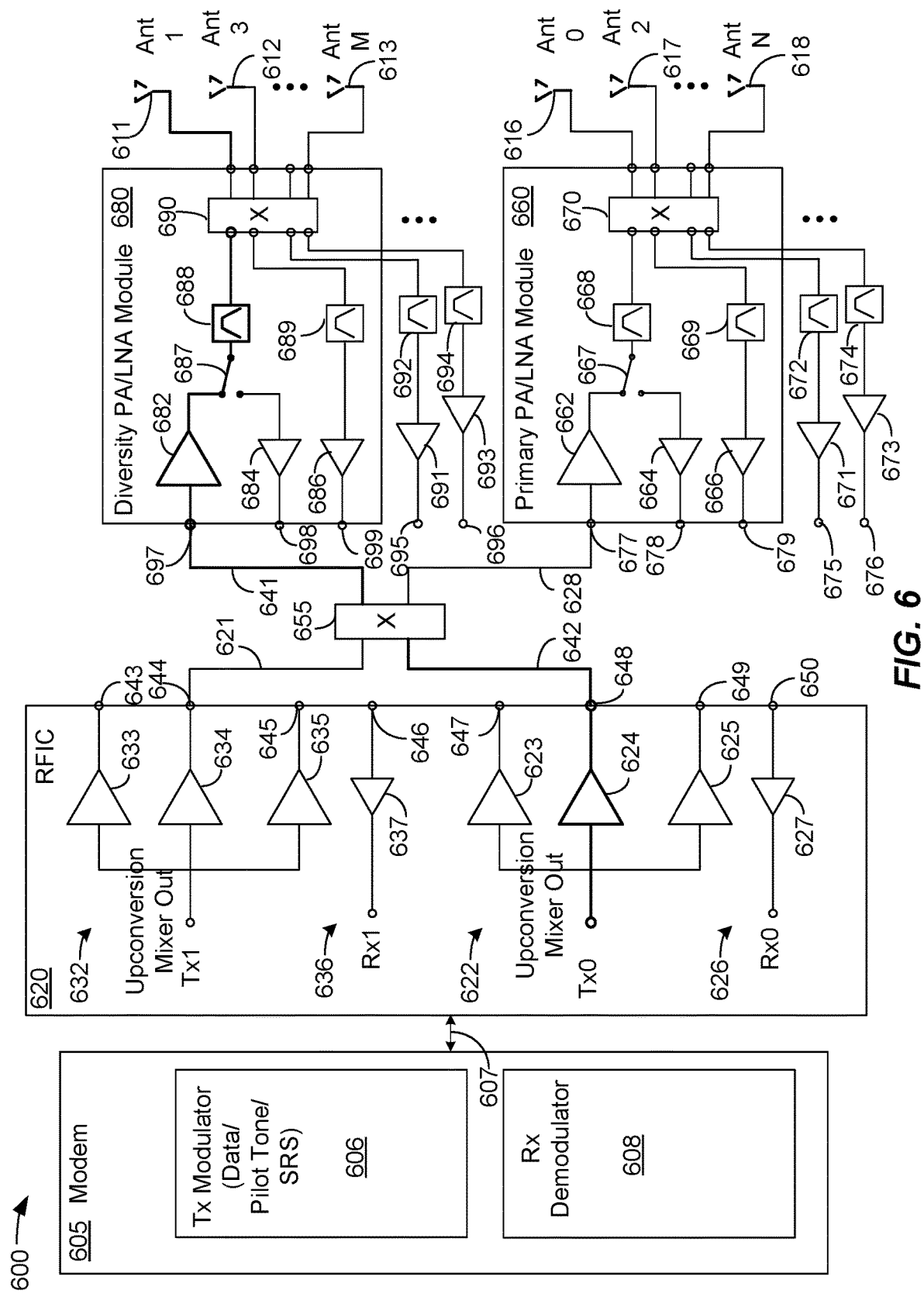
FIG. 6 is a block diagram showing an exemplary embodiment of a portion of a communication device in accordance with an exemplary embodiment.

FIG. 6 is a block diagram showing an exemplary embodiment of a portion of a communication device in accordance with an exemplary embodiment. Elements in FIG. 6 that are similar to elements in FIG. 4 will be numbered using the notation 6XX, where an element labeled 6XX in FIG. 6 is similar to an element labeled 4XX in FIG. 4.

In an exemplary embodiment, the communication device 600 includes a switch logic 655. The switch logic 655 may comprise discrete switches, switch networks, logic, communication lines, and/or other ways of switching communication signals. In an exemplary embodiment, the switch logic 655 may be connected to port 644 over connection 621, may be connected to port 697 over connection 641, may be connected to port 648 over connection 642, and may be connected to port 677 over connection 628. In an exemplary embodiment, the switch logic 655 may comprise a switching architecture referred to as double pole, two throw (DP2T, or DPDT), where either input to the switch logic 655 can be connected to either output of the switch logic 655.

Although shown in FIG. 6 as being external to the RFIC 620, the switch logic 655 may alternatively be located anywhere prior to the primary PA/LNA module 660 and the diversity PA/LNA module 680, such as within or as part of the RFIC 620.

In an exemplary embodiment where the switch logic 655 may route communication signals from the driver amplifier 624 to either of the power amplifiers 662 or 682; or where the switch logic 655 may route communication signals from the driver amplifier 634 to either of the power amplifiers 662 or 682, the switch logic 655 should be able to provide sufficient isolation to prevent a signal on the transmit path 622 (Tx0) from interfering with a signal on the transmit path 632 (Tx1) and to prevent a signal on the transmit path 632 (Tx1) from interfering with a signal on the transmit path 622 (Tx0). In an exemplary embodiment, it is desirable to provide at least approximately 30 dB to approximately 50 dB of isolation between the transmit path 622 (Tx0) and the transmit path 632 (Tx1). Moreover, the switch logic 655 should be able to provide at least approximately 30 dB to approximately 50 dB of isolation between the connections 642 and 621, between the connections 628 and 641, between the connections 621 and 641, and between the connections 642 and 628, depending on the configuration of the communication device 600. In an exemplary embodiment, switching the Tx0 and Tx1 signals using the switch logic 655 prior to the PA 682 and prior to the PA 662 maintains signal isolation, while allowing either transmit signal (Tx0 and Tx1) to be routed to any antenna 611, 612, 613 connected to the PA/LNA module 680, and/or any antenna 616, 617 and 618 connected to the PA/LNA module 660. In this example, a transmit signal (Tx0 and/or Tx1) can be routed to any antenna connected to either PA/LNA module 660 and PA/LNA module 680 without the use of any transmission line, coaxial cable, or any other interconnect or direct connection between the PA/LNA module 660 and PA/LNA module 680, thus minimizing the complexity and cost of the PA/LNA module 660 and PA/LNA module 680.

Figure 7:
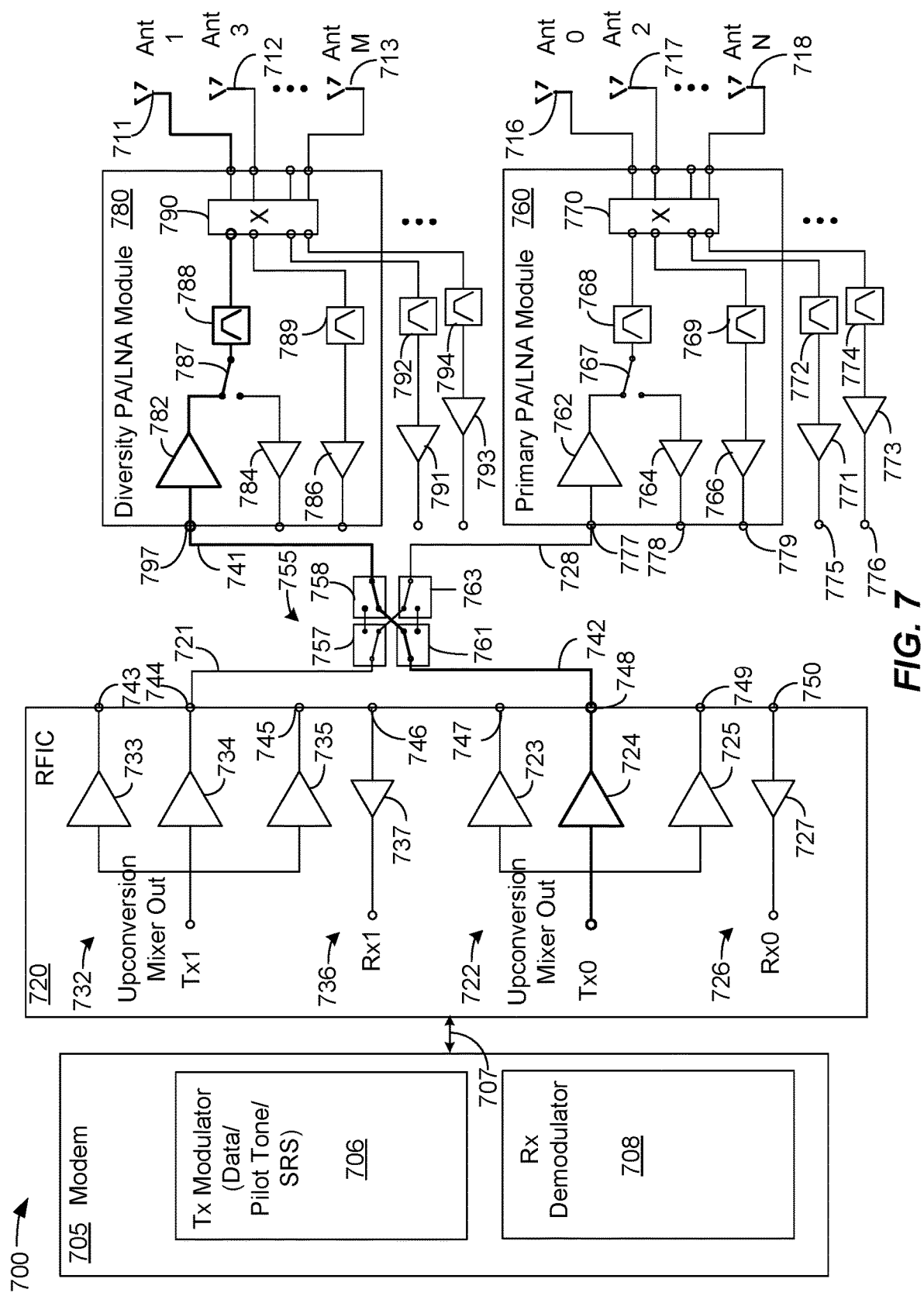
FIG. 7 is a block diagram showing an exemplary embodiment of a portion of a communication device in accordance with an exemplary embodiment.

FIG. 7 is a block diagram showing an exemplary embodiment of a portion of a communication device in accordance with an exemplary embodiment. Elements in FIG. 7 that are similar to elements in FIG. 4 and FIG. 6 will be numbered using the notation 7XX, where an element labeled 7XX in FIG. 7 is similar to an element labeled 4XX in FIGS. 4 and 6XX in FIG. 6.

In an exemplary embodiment, the communication device 700 includes a switch logic 755. In an exemplary embodiment, the switch logic 755 may comprise switches 757, 758, 761 and 763. In an exemplary embodiment, the switches 757, 758, 761 and 763 are shown as single pole,-dual throw (SPDT) switches. In an exemplary embodiment, the switch 757 may be connected to port 744 over connection 721, the switch 758 may be connected to port 797 over connection 741, the switch 761 may be connected to port 748 over connection 742, and the switch 763 may be connected to port 777 over connection 728. In an exemplary embodiment, the switch logic 755 may exhibit a switching architecture referred to as double pole, two throw (DP2T or DPDT). In some examples, the switch logic 755 is disposed on a substrate or board (e.g., PCB) on which one or more of the RFIC 720, primary PA/LNA module 760, and diversity PA/LNA module 780 are disposed. In some examples, the switch logic 755 is implemented with one or more discrete components or other elements or circuitry. In other examples, circuitry for the switch logic 755 is integrated in the circuitry in the PCB, or is implemented in another manner Although shown in FIG. 7 as being external to the RFIC 720, the switch logic 755 may alternatively be located anywhere prior to the primary PA/LNA module 760 and the diversity PA/LNA module 780, such as within or as part of the RFIC 720.

In an exemplary embodiment, the switch logic 755 may route communication signals from the driver amplifier 724 to either of the power amplifiers 762 or 782; and/or the switch logic 755 may route communication signals from the driver amplifier 734 to either of the power amplifiers 762 or 782. In an exemplary embodiment, it is preferable to have at least approximately 30 dB to approximately 50 dB isolation between the switch 757 and the switch 758, and between the switch 761 and the switch 763. Similarly, it is preferable to have at least approximately 30 dB to approximately 50 dB isolation between the switch 757 and the switch 761, and between the switch 763 and the switch 758. There are known switches that can, in some examples, provide such isolation when disposed, arranged, and configured as described herein.

In the exemplary embodiment shown in FIG. 7 in a single transmitter example, the switch logic 755 is configured to route the transmit signal (Tx0) from the driver amplifier 724 to the power amplifier 782 on the diversity PA/LNA module 780. In this manner a signal from the transmit path 722 (Tx0) can be routed to the diversity PA/LNA module 780, which can then route the transmit signal to any of the antennas 711, 712 and 713 via the switch 790.

In an exemplary embodiment, when the switch logic 755 is configured in the position shown, switching the Tx0 signal from the transmit path 722 using the switch logic 755 prior to the PA 782 and prior to the PA 762 maintains isolation, while allowing the transmit signal (Tx0) to be routed to any antenna 711, 712, 713 connected to the PA/LNA module 780. In this example, a transmit signal (Tx0) can be routed from the transmit path 722 to any antenna connected to the diversity PA/LNA module 780 in this example without the use of any transmission line, coaxial cable, or any other interconnect between the primary PA/LNA module 760 and the diversity PA/LNA module 780, thus minimizing the complexity and cost of the primary PA/LNA module 760 and diversity PA/LNA module 780. Similarly, a transmit signal (Tx1) can be routed from the transmit path 732 to any antenna connected to the primary PA/LNA module 760. In an exemplary embodiment, either transmit signal, Tx0 and Tx1, can be routed to any antenna connected to either of the primary PA/LNA module 760 and the diversity PA/LNA module 780.

Figure 8:
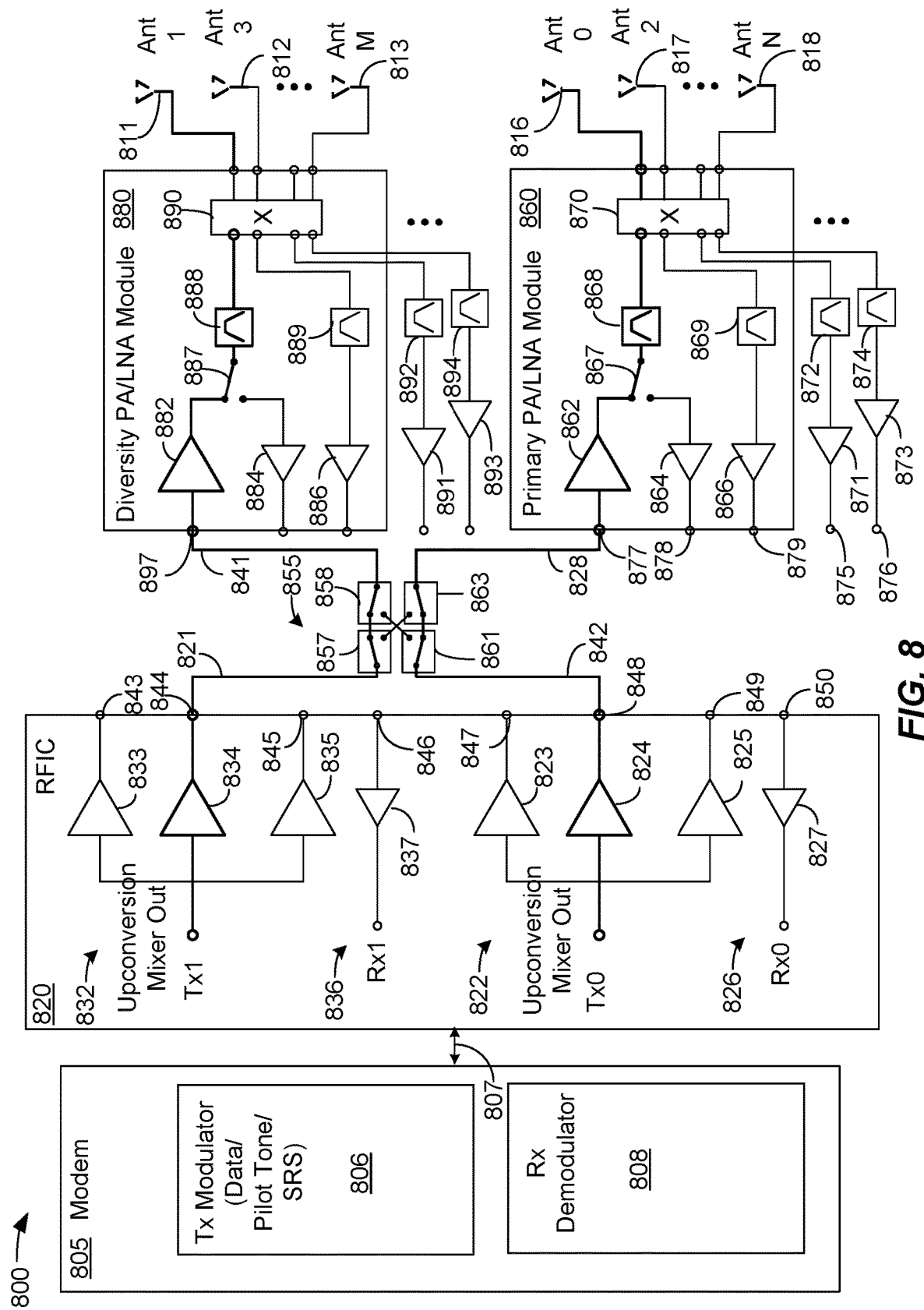
FIG. 8 is a block diagram showing an exemplary embodiment of a portion of a communication device in accordance with an exemplary embodiment.

FIG. 8 is a block diagram showing an exemplary embodiment of a portion of a communication device in accordance with an exemplary embodiment. Elements in FIG. 8 that are similar to elements in FIG. 4 and FIG. 6 will be numbered using the notation 8XX, where an element labeled 8XX in FIG. 8 is similar to an element labeled 4XX in FIGS. 4 and 6XX in FIG. 6.

In an exemplary embodiment, the communication device 800 includes a switch logic 855. In an exemplary embodiment, the switch logic 855 may comprise switches 857, 858, 861 and 863. In an exemplary embodiment, the switches 857, 858, 861 and 863 are shown as single pole, dual throw (SPDT) switches. In an exemplary embodiment, the switch 857 may be connected to port 844 over connection 821, the switch 858 may be connected to port 897 over connection 841, the switch 861 may be connected to port 848 over connection 842, and the switch 863 may be connected to port 877 over connection 828. In an exemplary embodiment, the switch logic 855 may exhibit an architecture referred to as double pole, two throw (DP2T or DPDT).

Although shown in FIG. 8 as being external to the RFIC 820, the switch logic 855 may alternatively be located anywhere prior to the primary PA/LNA module 860 and the diversity PA/LNA module 880, such as within or as part of the RFIC 820.

In an exemplary embodiment, the switch logic 855 may route communication signals from the driver amplifier 824 to either of the power amplifiers 862 or 882; and the switch logic 855 may route communication signals from the driver amplifier 834 to either of the power amplifiers 862 or 882. In an exemplary embodiment, it is preferable to have at least approximately 30 dB to approximately 50 dB isolation between the switch 857 and the switch 858, and between the switch 861 and the switch 863. Similarly, it is preferable to have at least approximately 30 dB to approximately 50 dB isolation between the switch 857 and the switch 861, and between the switch 863 and the switch 858.

In the exemplary embodiment shown in FIG. 8 in a multiple transmitter Tx (MIMO) example, the switch logic 855 is configured to route the transmit signal (Tx0) from the driver amplifier 824 to the power amplifier 862 on the primary PA/LNA module 860; and is configured to route the transmit signal (Tx1) from the driver amplifier 834 to the power amplifier 882 on the diversity PA/LNA module 880. In this manner a signal from the transmit path 822 (Tx0) can be routed to the primary PA/LNA module 860, which can then route the transmit signal (Tx0) to any of the antennas 816, 817 and 818 via the switch 870; and a signal from the transmit path 832 (Tx1) can be routed to the diversity PA/LNA module 880, which can then route the transmit signal (Tx1) to any of the antennas 811, 812 and 813 via the switch 890.

In another example, the switch logic 855 can be configured to route the transmit signal (Tx0) from the driver amplifier 824 to the power amplifier 882 on the diversity PA/LNA module 880; and can be configured to route the transmit signal (Tx1) from the driver amplifier 834 to the power amplifier 862 on the primary PA/LNA module 860. In this manner a signal from the transmit path 822 (Tx0) can be routed to the diversity PA/LNA module 880, which can then route the transmit signal (Tx0) to any of the antennas 811, 812 and 813 via the switch 890; and a signal from the transmit path 832 (Tx1) can be routed to the primary PA/LNA module 860, which can then route the transmit signal (Tx1) to any of the antennas 816, 817 and 818 via the switch 870.

In an exemplary embodiment, when the switch logic 855 is configured in the position shown, switching the Tx0 signal from the transmit path 822 and switching the Tx1 signal from the transmit path 832 using the switch logic 855 prior to the PA 882 and prior to the PA 862 maintains isolation, while allowing the transmit signal (Tx0) to be routed to any antenna 816, 817, 818 connected to the primary PA/LNA module 860 and while allowing the transmit signal (Tx1) to be routed to any antenna 811, 812, 813 connected to the diversity PA/LNA module 880 in this example without the use of any transmission line, coaxial cable, or any other interconnect between the primary PA/LNA module 860 and diversity PA/LNA module 880, thus minimizing the complexity and cost of the primary PA/LNA module 860 and diversity PA/LNA module 880. In this example, a transmit signal (Tx0) can be routed from the transmit path 822 to any antenna connected to the diversity PA/LNA module 860 or the primary PA/LNA module 880; and a transmit signal (Tx1) can be routed from the transmit path 832 to any antenna connected to the diversity PA/LNA module 880 or the primary PA/LNA module 880.

Figure 9:
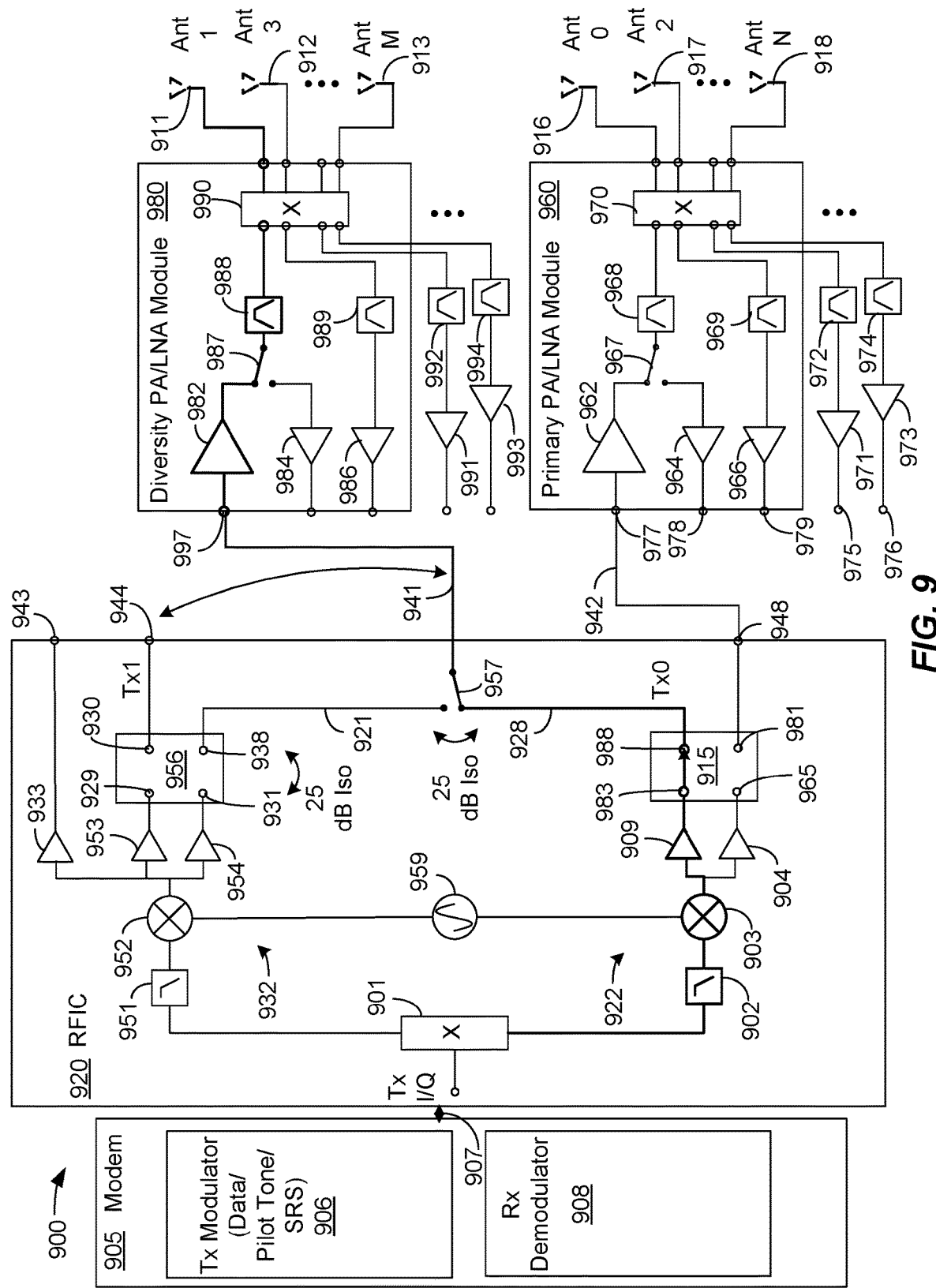
FIG. 9 is a block diagram showing an exemplary embodiment of a portion of a communication device in accordance with an exemplary embodiment.

FIG. 9 is a block diagram showing an exemplary embodiment of a portion of a communication device in accordance with an exemplary embodiment. Elements in FIG. 9 that are similar to elements in FIG. 4 will be numbered using the notation 9XX, where an element labeled 9XX in FIG. 9 is similar to an element labeled 4XX in FIG. 4 unless described otherwise.

In an exemplary embodiment, the communication device 900 includes a modem 905, an RFIC 920, a primary PA/LNA module 960 and a diversity PA/LNA module 980. In an exemplary embodiment, the RFIC 920 may include a switch logic 901, a transmit path 922, a transmit path 932 a switch logic 956, a switch logic 915 and a switch logic 957. The switch logic 901, switch logic 956, switch logic 915 and switch logic 957 may comprise switches, communication lines, logic, and/or other ways of switching communication signals. In an exemplary embodiment I and Q communication signals may be routed to one or both of the transmit path 922 and the transmit path 932. In an exemplary embodiment, the switch logic 901 may be configured to switch baseband signals and may be referred to as baseband switch logic.

In an exemplary embodiment, the transmit path 922 may include a filter 902, a mixer 903, driver amplifiers 904 and 909, and the switch logic 915. In an exemplary embodiment, the transmit path 932 may include a filter 951, a mixer 952, driver amplifiers 933, 953 and 954, and the switch logic 956. A local oscillator (LO) signal generator 959 may provide an LO signal to the mixer 903 and the mixer 952. In an exemplary embodiment, baseband communication signals may also be provided to the mixer 903 from the filter 902 and to the mixer 952 from the filter 951. In some embodiments, separate LO signal generators may be implemented for each mixer.

In an exemplary embodiment, the switch logic 956 may have a port 930 connected to the port 944 and may have a port 938 connected to the switch logic 957 over connection 921. In an exemplary embodiment, the switch 915 may have a port 981 connected to the port 948 and may have a port 988 connected to the switch logic 957 over connection 928.

The driver amplifier 953 may be connected to the port 929 and the driver amplifier 954 may be connected to the port 931. The driver amplifier 909 may be connected to the port 983 and the driver amplifier 904 may be connected to the port 965.

In an exemplary embodiment, when non-conductive, the switch logic 915 may provide approximately 15 dB to approximately 25 dB of isolation between the port 965 and the port 981, and between the port 983 and the port 988. Similarly, in an exemplary embodiment, when non-conductive, the switch logic 956 may provide approximately 15 dB to approximately 25 dB of isolation between the port 931 and the port 938, and between the port 929 and the port 930. The switch logic 915 may also provide approximately 15 dB to approximately 25 dB isolation between the port 983 and the port 965, and may provide approximately 15 dB to approximately 25 dB isolation between the port 988 and the port 981. The switch logic 956 may also provide approximately 15 dB to approximately 25 dB isolation between the port 929 and the port 931, and may provide approximately 15 dB to approximately 25 dB isolation between the port 930 and the port 938.

In an exemplary embodiment, when non-conductive, the switch logic 957 may provide approximately 15 dB to approximately 25 dB of isolation between the connection 928 and the connection 921. Other levels of isolation may be provided depending on implementation. In this single Tx example where a transmit signal (Tx0) is provided from the transmit path 922, through the switch logic 915 to the connection 928, then through the switch logic 957 to the connection 941 to the PA 982 in the diversity PA/LNA module 980, the switch logic-956 and the switch logic 957 provide a combined approximately 30 dB to approximately 50 dB of isolation between the port 944 and the connection 941 and provide a combined isolation level sufficient to meet Tx EVM and intermodulation requirements in a ULCA communication system. There are known switches that can, in some examples, provide such isolation when disposed, arranged, and configured as described herein. The isolation values mentioned herein are exemplary and are dependent upon application.

In an exemplary embodiment, when the switch logic 915 and the switch logic 957 are in the position shown switching the Tx0 signal from the transmit path 922 using the switch logic 915 and the switch logic 957, both located in the RFIC 920 in this example, and located prior to the PA 982 and prior to the PA 962, to the diversity PA/LNA module 980 maintains isolation, while allowing the transmit signal (Tx0) to be routed to any antenna 911, 912, 913 connected to the diversity PA/LNA module 980. Similarly, a transmit signal (Tx0) can be routed from the transmit path 922 to any antenna connected to the primary PA/LNA module 960 by appropriately configuring the switch logic 901 and the switch logic 915. In an exemplary embodiment, a transmit signal (Tx0) having a sounding reference signal can be transmitted by any antenna, for example such that an SRS may serially be transmitted by each relevant antenna in a short amount of time allowed by communication standards such as 5G. In this example, a transmit signal (Tx0) can be routed from the transmit path 922 to any antenna connected to the diversity PA/LNA module 980 or to the primary PA/LNA module 960 in this example without the use of any transmission line, coaxial cable, or any other interconnect or direct connection between the primary PA/LNA module 960 and the diversity PA/LNA module 980, thus minimizing the complexity and cost of the primary PA/LNA module 960 and diversity PA/LNA module 980. Similarly, a transmit signal (Tx1) can be routed from the transmit path 932 to any antenna connected to the primary PA/LNA module 960 or on the diversity PA/LNA module 980.

Figure 10:
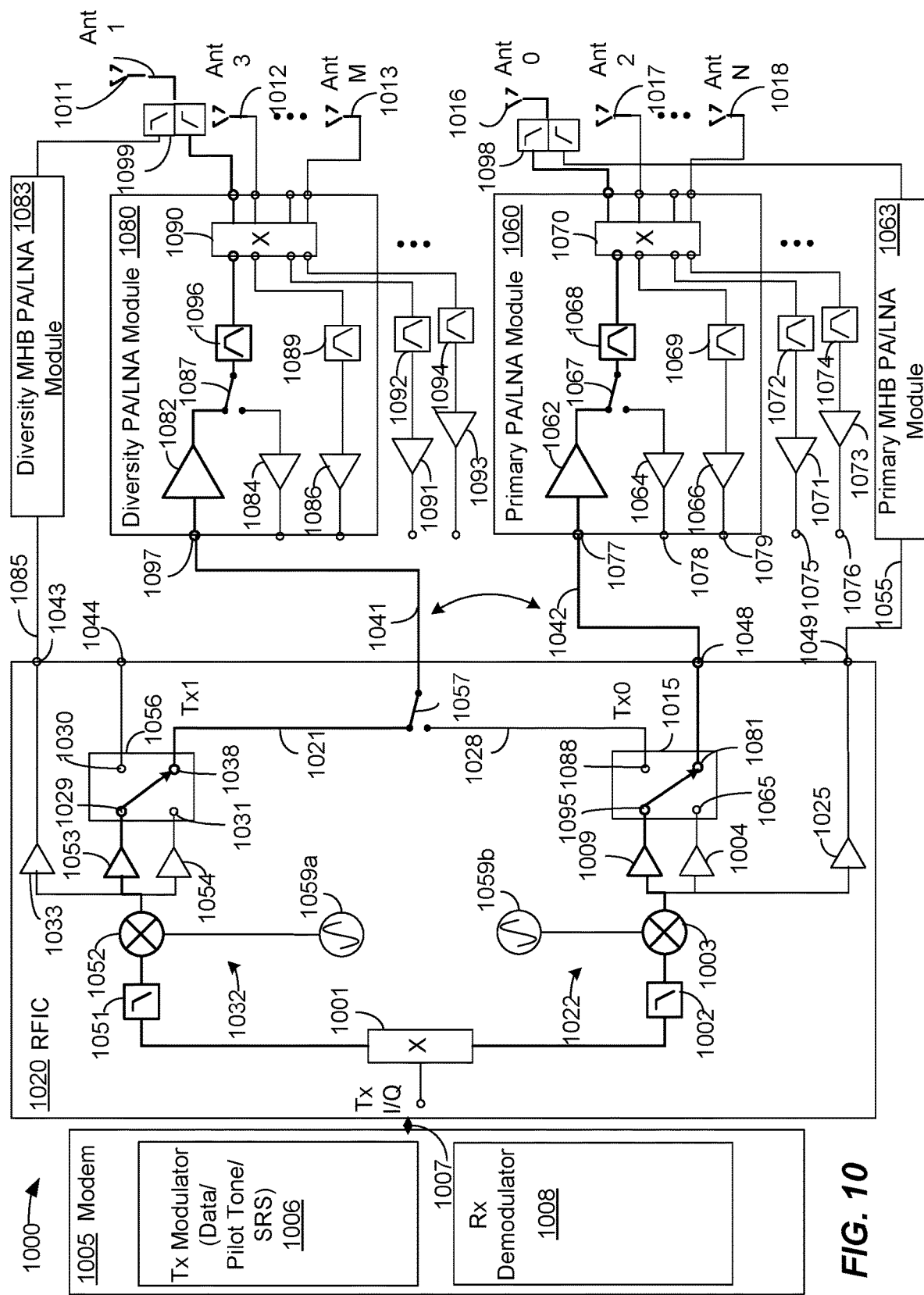
FIG. 10 is a block diagram showing an exemplary embodiment of a portion of a communication device in accordance with an exemplary embodiment.

FIG. 10 is a block diagram showing an exemplary embodiment of a portion of a communication device in accordance with an exemplary embodiment. Elements in FIG. 10 that are similar to elements in FIG. 4 and FIG. 9 will be numbered using the notation 10XX, where an element labeled 10XX in FIG. 10 is similar to an element labeled 4XX in FIGS. 4 and 9XX in FIG. 9 unless described otherwise.

In an exemplary embodiment, the communication device 1000 includes a modem 1005, an RFIC 1020, a primary PA/LNA module 1060 and a diversity PA/LNA module 1080. In an exemplary embodiment, additional primary MHB PA/LNA module 1063 and additional diversity MHB PA/LNA module 1083 may also be included. Although detail is omitted for ease of illustration, the primary MHB PA/LNA module 1063 may be similar to the primary PA/LNA module 1060 and the diversity MHB PA/LNA module 1083 may be similar to the diversity PA/LNA module 1080. The primary MHB PA/LNA module 1063 may be connected to a driver amplifier 1025 and port 1049 over connection 1055. The diversity MHB PA/LNA module 1083 may be connected to a driver amplifier 1033 and port 1043 over connection 1085. In the example shown in FIG. 10, a diplexer 1098 may be connected to the antenna 1016 (Ant 0) to allow sharing of the antenna 1016 (Ant 0) to support carrier aggregation (CA) implementations and Tx sounding reference signal carrier switching. Similarly, a diplexer 1099 may be connected to the antenna 1011 (Ant1) to allow sharing of the antenna 1011 (Ant1) to support carrier aggregation (CA) implementations and Tx sounding reference signal carrier switching.

In an exemplary embodiment, the RFIC 1020 may include a switch logic 1001, a transmit path 1022, a transmit path 1032, a switch logic 1057, a switch logic 1015 and a switch logic 1056. The switch logic 1001, switch logic 1057, switch logic 1015 and a switch logic 1056 may comprise switches, communication lines, logic, and/or other ways of switching communication signals. In an exemplary embodiment I and Q communication signals may be routed to one or both of the transmit path 1022 and the transmit path 1032.

In an exemplary embodiment, the transmit path 1022 may include a filter 1002, a mixer 1003, driver amplifiers 1004 and 1009, and the switch logic 1015. In an exemplary embodiment, the transmit path 1032 may include a filter 1051, a mixer 1052, driver amplifiers 1053 and 1054, and the switch logic 1056. A local oscillator (LO) signal generator 1059*b* may provide an LO signal to the mixer 1003 and local oscillator (LO) signal generator 1059*a* may provide an LO signal to the mixer 1052. In some embodiments, a single LO signal generator may be implemented. In an exemplary embodiment, baseband communication signals may also be provided to the mixer 1003 from the filter 1002 and to the mixer 1052 from the filter 1051.

In an exemplary embodiment, the switch logic 1056 may have a port 1030 connected to the port 1044 and may have a port 1038 connected to the switch 1057 over connection 1021. In an exemplary embodiment, the switch 1015 may have a port 1081 connected to the port 1048 and may have a port 1088 connected to the switch 1057 over connection 1028.

The driver amplifier 1053 may be connected to the port 1029 and the driver amplifier 1054 may be connected to the port 1031. The driver amplifier 1009 may be connected to the port 1095 and the driver amplifier 1004 may be connected to the port 1065.

In an exemplary embodiment, when non-conductive the switch logic 1015 may provide approximately 15 dB to approximately 25 dB of isolation between the port 1065 and the port 1081, and between the port 1095 and the port 1088. Similarly, in an exemplary embodiment, when non-conductive the switch logic 1056 may provide approximately 15 dB to approximately 25 dB of isolation between the port 1031 and the port 1038, and between the port 1029 and the port 1030.

In an exemplary embodiment, when non-conductive, the switch logic 1057 may provide approximately 15 dB to approximately 25 dB of isolation between the connection 1028 and the connection 1021.

In this Tx MIMO example where a transmit signal (Tx0) is provided from the transmit path 1022, through the switch logic 1015 to the port 1048, over the connection 1042 to the PA 1062 on the primary PA/LNA module 1060; and where a transmit signal (Tx1) is provided from the transmit path 1032, through the switch logic 1056 to the port 1038 and the connection 1021 to the switch logic 1057, over connection 1041 to the PA 1082 on the diversity PA/LNA module 1080, the switch logic 1015 and the switch logic 1057 provide a combined approximately 30 dB to approximately 50 dB of isolation between the connection 1042 and the connection 1041.

In an exemplary embodiment, when the switch logic 1015, the switch logic 1056, and the switch logic 1057 are in the position shown switching the Tx0 signal from the transmit path 1022 using the switch logic 1015 located in the RFIC 1020 in this example, and located prior to the PA 1082 on the diversity PA/LNA module 1080 and prior to the PA 1062 on the primary PA/LNA module 1060; and switching the Tx1 signal from the transmit path 1032 using the switch logic 1056 and the switch logic 1057, both located in the RFIC 1020 in this example, and located prior to the PA 1082 on the diversity PA/LNA module 1080 maintains isolation between the transmit signal Tx0 and the transmit signal Tx1, while allowing the transmit signal (Tx0) to be routed to any antenna 1016, 1017, 1018 connected to the primary PA/LNA module 1060 and while allowing the transmit signal (Tx1) to be routed to any antenna 1011, 1012, 1013 connected to the diversity PA/LNA module 1080.

In this example, a transmit signal (Tx0) can be routed from the transmit path 1022 to any antenna connected to the primary PA/LNA module 1060 or any antenna connected to the diversity PA/LNA module 1080; and a transmit signal (Tx1) can be routed from the transmit path 1032 to any antenna connected to the diversity PA/LNA module 1080 in this example without the use of any transmission line, coaxial cable, or any other interconnect or direct connection between the primary PA/LNA module 1060 and the diversity PA/LNA module 1080, thus minimizing the complexity and cost of the primary PA/LNA module 1060 and diversity PA/LNA module 1080. In this example a transmit signal (Tx0) having a Sounding Reference Signal (SRS) can be transmitted by any antenna connected to the PA/LNA module 1060 and a transmit signal (Tx1) having a Sounding Reference Signal (SRS) can be transmitted by any antenna connected to the PA/LNA module 1080. For example, for SRS carrier switching in a DLCA band combination, n41+ n79, in which only n79 or n41 is transmitting UL MIMO in either band. Both of the available transmitters (in the transceiver) may be in use, therefore they cannot be used to sound the antennas of the other band. Accordingly, an SRS carrier switching framework may be used. SRS carrier switching downgrades the current UL MIMO band to SISO Tx, and the other available Tx chain is used to sound the antennas of the other band. After the other band antennas have been sounded, then the primary band UL MIMO can be restored. Either transmit signal Tx0 or transmit signal Tx1 can also be routed to the primary MHB PA/LNA module 1063 or the diversity MHB PA/LNA module 1083 via the switch logic 1015, switch logic 1056 and switch logic 1057. In an exemplary embodiment, the local oscillator (LO) signal generators 1059a or 1059b may be programmed to the appropriate frequency in the MHB respectively. The MHB PA/LNA modules 1063 and/or 1083 have a plurality of antenna connections (shared with Ant0, Ant1, etc.), similar to PA/LAN modules 1080 and 1060. The MHB PA/LNA modules 1063 and 1083 that support TDD bands will also benefit from this architecture that uses the switch logic in the RFIC 1020 to support inter-band SRS carrier switching.

Figure 11:
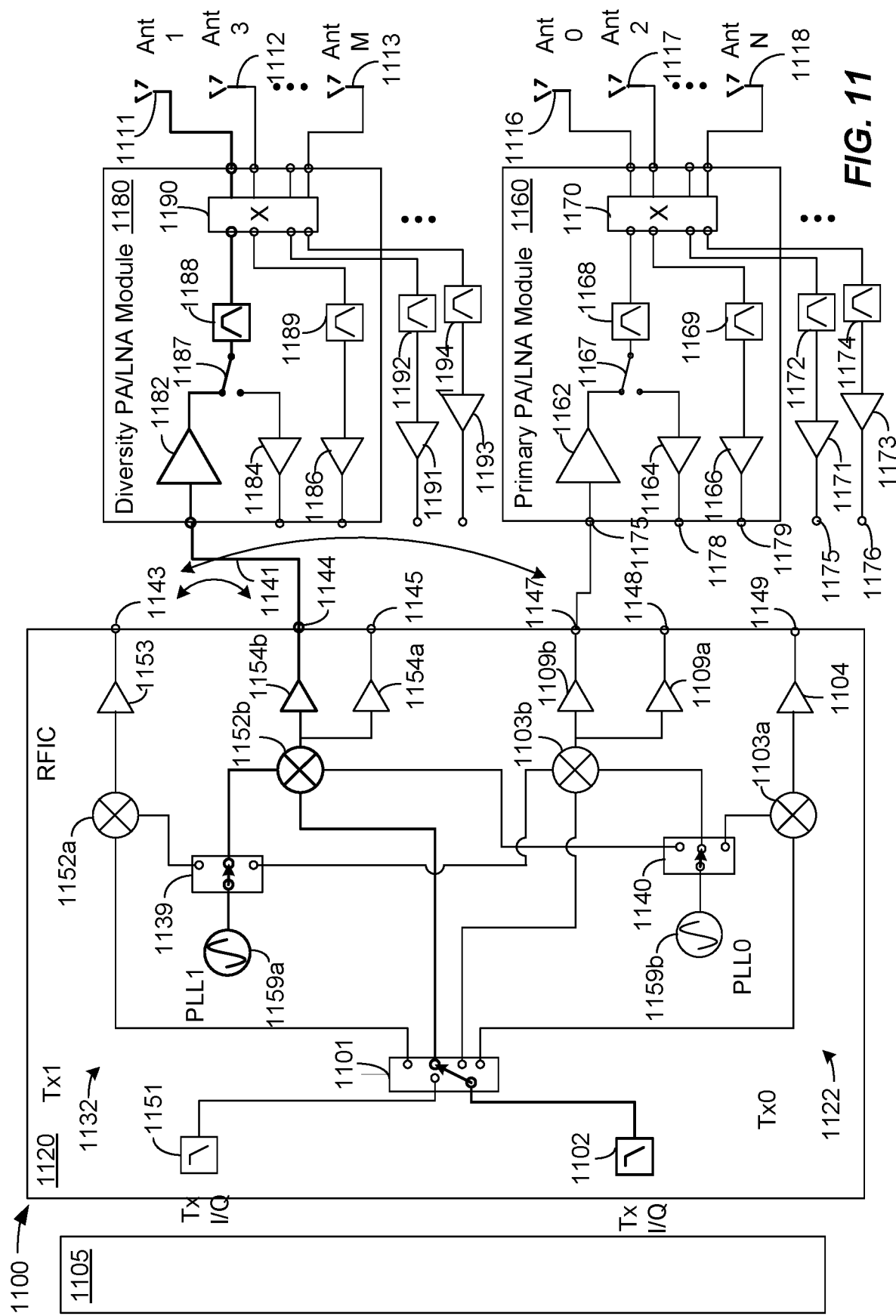
FIG. 11 is a block diagram showing an exemplary embodiment of a portion of a communication device in accordance with an exemplary embodiment.

FIG. 11 is a block diagram showing an exemplary embodiment of a portion of a communication device in accordance with an exemplary embodiment. Elements in FIG. 11 that are similar to elements in FIG. 4 and FIG. 9 will be numbered using the notation 11XX, where an element labeled 11XX in FIG. 11 is similar to an element labeled 4XX in FIG. 4 or an element labeled 9XX in FIG. 9 unless described otherwise.

In an exemplary embodiment, the communication device 1100 includes a modem 1105, an RFIC 1120, a primary PA/LNA module 1160 and a diversity PA/LNA module 1180.

In an exemplary embodiment, the RFIC 1120 may include a switch logic 1101, a transmit path 1122, a transmit path 1132, a switch logic 1139 and a switch logic 1140. The switch logic 1101 may comprise switches, communication lines, logic, and/or or other ways of switching communication signals. In an exemplary embodiment I and Q communication signals may be routed to one or both of the transmit path 1122 and the transmit path 1132.

In an exemplary embodiment, the transmit path 1122 may include a filter 1102, the switch logic 1101, a mixer 1103a, a mixer 1103b, and driver amplifiers 1104, 1109a and 1109b. In an exemplary embodiment, the transmit path 1132 may include a filter 1151, the switch logic 1101, a mixer 1152a, a mixer 1152b, and driver amplifiers 1153, 1154a and 1154b. A local oscillator (LO) signal generator 1159a may provide an LO signal to the switch logic 1139 (and selectively to the mixers 1152a, 1152b and 1103b). A local oscillator (LO) signal generator 1159b may provide an LO signal to the switch logic 1140 (and selectively to the mixers 1103a, 1103b and 1152b).

In the exemplary embodiment shown in FIG. 11, the switching of the Tx0 and Tx1 transmit signals may occur prior to signal upconversion (i.e., prior to the mixers 1152a, 1152b, 1103a and 1103b). In some exemplary embodiment, it may be preferable to switch the PLL inputs, that is, to switch the outputs of the LO signal generators 1159a and 1159b among the mixers 1103a, 1103b, 1152a and 1152b via the switch logic 1139 and switch logic 1140, than to switch the driver amplifier output signal at the ports 1143, 1144, 1145, 1147, 1148 and 1149.

In an exemplary embodiment, the switch logic 1101 may be configured to switch the output of the filters 1102 and 1151 to one or more of the mixer 1152a, the mixer 1152b, the mixer 1103a and the mixer 1103b. In an exemplary embodiment, the switch logic 1139 may be configured to switch the output of the LO signal generator 1159a to one or more of the mixers 1152a, 1152b and 1103b; and the switch logic 1140 may be configured to switch the output of the LO signal generator 1159b to one or more of the mixers 1152b, 1103b and 1103a.

In an exemplary embodiment, the mixer 1103a and the driver amplifier 1104; and the mixer 1152a and driver amplifier 1153 may be configured to operate on what is referred to as a mid-high band (MHB).

In an exemplary embodiment, the mixer 1103b and the driver amplifiers 1109a and 1109b; and the mixer 1152b and driver amplifiers 1154a and 1154b may be configured to operate on what is referred to as an ultra-high band (UHB).

In an exemplary embodiment, switching the Tx0 signal from the transmit path 1122 using the switch logic 1101 to direct the Tx0 signal to the mixer 1152b, configuring the switch logic 1139 to provide the output of the LO signal generator 1159a to the mixer 1152b, and providing the output of the mixer 1152b to the driver amplifier 1154b over the connection 1141 to the PA 1182 on the diversity PA/LNA module 1180, by controlling the input signals to the mixer 1152b, in this example, maintains isolation, while allowing the transmit signal (Tx0) to be routed to any antenna 1111, 1112, 1113 connected to the diversity PA/LNA module 1180. In this example, when the switch logic 1101, the switch logic 1139 and the switch logic 1140 are configured as shown, a transmit signal (Tx0) can be routed from the transmit path 1122 to any antenna connected to the diversity PA/LNA module 1180 in this example without the use of any transmission line, coaxial cable, or any other interconnect between the primary PA/LNA module 1160 and the diversity PA/LNA module 1180, thus minimizing the complexity and cost of the primary PA/LNA module 1160 and diversity PA/LNA module 1180. Similarly, a transmit signal (Tx0) can be routed from the transmit path 1122 to any antenna connected to the primary PA/LNA module 1160 and transmit signal (Tx1) can be routed from the transmit path 1132 to any antenna connected to the primary PA/LNA module 1160 or the diversity PA/LNA module 1180. In this example a transmit signal (Tx0) Sounding Reference Signal (SRS) can be transmitted by any antenna connected to the primary PA/LNA module 1060 or connected to the diversity PA/LNA module 1180 and a transmit signal (Tx1) Sounding Reference Signal (SRS) can be transmitted by any antenna connected to the primary PA/LNA module 1060 or connected to the diversity PA/LNA module 1180. Similarly, SRS carrier switching in DLCA band combination may be supported.

Figure 12:
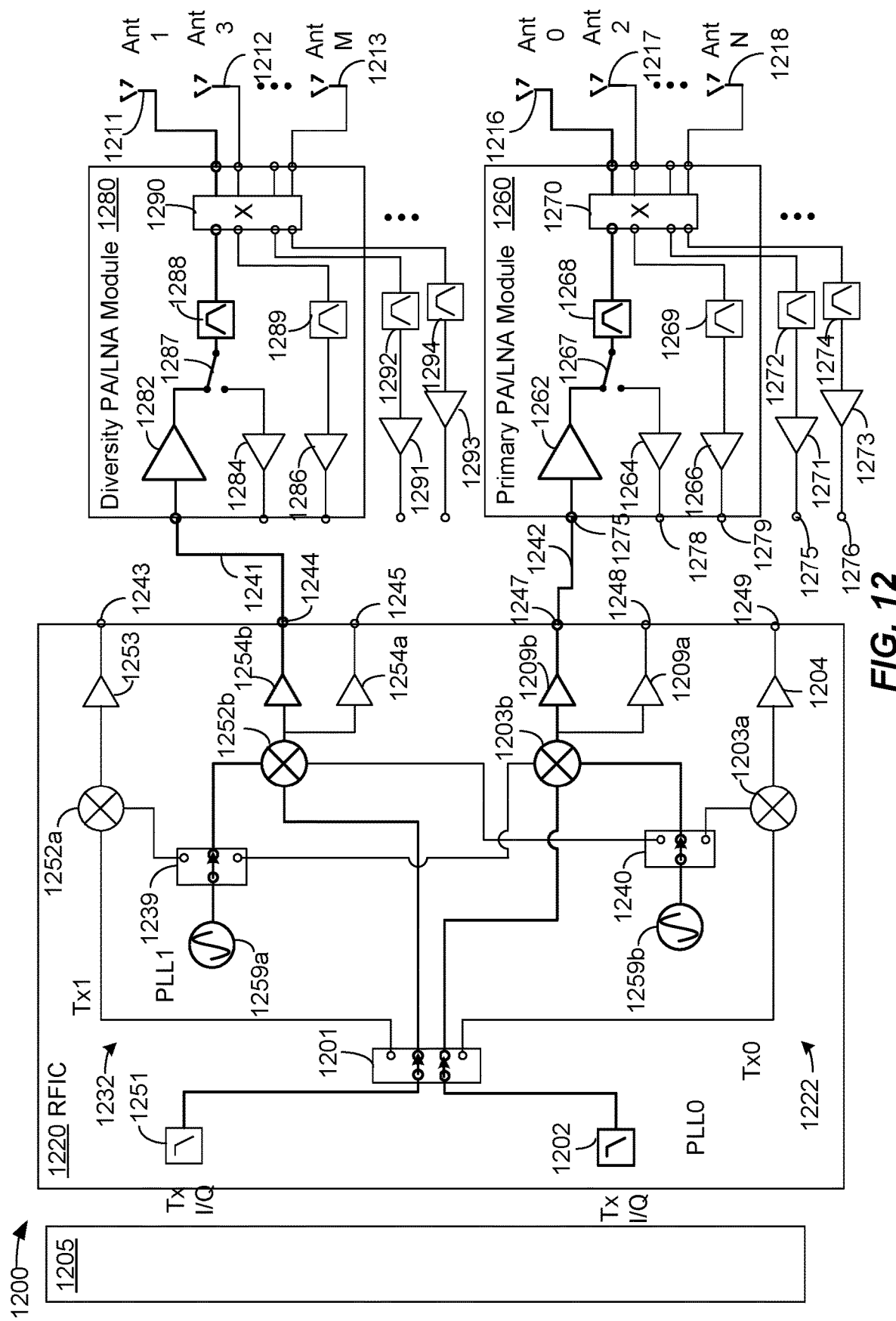
FIG. 12 is a block diagram showing an exemplary embodiment of a portion of a communication device in accordance with an exemplary embodiment.

FIG. 12 is a block diagram showing an exemplary embodiment of a portion of a communication device in accordance with an exemplary embodiment. Elements in FIG. 12 that are similar to elements in FIG. 4 and FIG. 10 will be numbered using the notation 12XX, where an element labeled 12XX in FIG. 12 is similar to an element labeled 4XX in FIG. 4 or an element labeled 10XX in FIG. 10 unless described otherwise.

In an exemplary embodiment, the communication device 1200 includes a modem 1205, an RFIC 1220, a primary PA/LNA module 1260 and a diversity PA/LNA module 1280.

In an exemplary embodiment, the RFIC 1220 may include a switch logic 1201, a transmit path 1222, a transmit path 1232, a switch logic 1239 and a switch logic 1240. The switch logic 1201, switch logic 1239 and switch logic 1240 may comprise switches, communication lines, logic, and/or other ways of switching communication signals. In an exemplary embodiment I and Q communication signals may be routed to one or both of the transmit path 1222 and the transmit path 1232.

In an exemplary embodiment, the transmit path 1222 may include a filter 1202, the switch logic 1201, a mixer 1203*a*, a mixer 1203*b*, and driver amplifiers 1204, 1209*a* and 1209*b*. In an exemplary embodiment, the transmit path 1232 may include a filter 1251, the switch logic 1201, a mixer 1252*a*, a mixer 1252*b*, and driver amplifiers 1253, 1254*a* and 1254*b*. A local oscillator (LO) signal generator 1259*a* may provide an LO signal to the switch logic 1239 (and selectively to the mixers 1252*a*, 1252*b* and 1203*b*). A local oscillator (LO) signal generator 1259*b* may provide an LO signal to the switch logic 1240 (and selectively to the mixers 1203*a*, 1203*b* and 1252*b*).

In the exemplary embodiment shown in FIG. 12, the switching of the Tx0 and Tx1 transmit signals may occur prior to signal upconversion (i.e., prior to the mixers 1203*a*, 1203*b*, 1252*a* and 1252*b*). It may be preferable to switch the PLL inputs, that is, to switch the outputs of the LO signal generators 1259*a* and 1259*b* among the mixers 1203*a*, 1203*b*, 1252*a* and 1252*b*, than to switch the output signal at the ports 1243, 1244, 1245, 1247, 1248 and 1249.

In an exemplary embodiment, the switch logic 1201 may be configured to switch the output of the filters 1202 and 1251 to one or more of the mixer 1252*a*, the mixer 1252*b*, the mixer 1203*a* and the mixer 1203*b*. Similarly, the switch logic 1239 may be configured to switch the output of the LO signal generator 1259*a* to one or more of the mixers 1252*a*, 1252*b* and 1203*b*; and the switch logic 1240 may be configured to switch the output of the LO signal generator 1259*b* to one or more of the mixers 1252*b*, 1203*b* and 1203*a*.

In an exemplary embodiment, the mixer 1203*a* and the driver amplifier 1204; and the mixer 1252*a* and driver amplifier 1253 may be configured to operate on what is referred to as a mid-high band (MHB).

In an exemplary embodiment, the mixer 1203*b* and the driver amplifiers 1209*a* and 1209*b*; and the mixer 1252*b* and driver amplifiers 1254*a* and 1254*b* may be configured to operate on what is referred to as an ultra-high band (UHB).

In this Tx MIMO example where a transmit signal (Tx0) is provided from the transmit path 1222, through the switch logic 1201, through the mixer 1203*b* and the driver amplifier 1209*b* to the port 1247, over the connection 1242 to the PA 1262 on the primary PA/LNA module 1260; and where a transmit signal (Tx1) is provided from the transmit path 1232, through the switch logic 1201, through the mixer 1252*b* and the driver amplifier 1254*b* to the port 1244 and the connection 1241 to the PA 1282 on the diversity PA/LNA module 1280, a combined approximately 30 dB to approximately 50 dB of isolation is provided between the connection 1242 and the connection 1241. There are known switches that can, in some examples, provide such isolation when disposed, arranged, and configured as described herein.

In an exemplary embodiment, when the switch logic 1201, the witch logic 1239 and the switch logic 1240 are configured as shown, switching the Tx0 signal from the transmit path 1222 by selectively switching the inputs to the mixer 1203*b* and switching the Tx1 signal from the transmit path 1232 by selectively switching the inputs to the mixer 1252*b* maintains isolation between the connections 1241 and 1242, while allowing the transmit signal (Tx0) to be routed to any antenna 1216, 1217, 1218 connected to the primary PA/LNA module 1260 and while allowing the transmit signal (Tx1) to be routed to any antenna 1211, 1211, 1213 connected to the diversity PA/LNA module 1280, in this example. In this example, a transmit signal (Tx0) can be routed from the transmit path 1222 to any antenna connected to the primary PA/LNA module 1260 or connected to the diversity PA/LNA module 1280; and a transmit signal (Tx1) can be routed from the transmit path 1232 to any antenna connected to the primary PA/LNA module 1260 or connected to the diversity PA/LNA module 1280 in this example without the use of any transmission line, coaxial cable, or any other interconnect or direct connection between the primary PA/LNA module 1260 and the diversity PA/LNA module 1280, thus minimizing the complexity and cost of the primary PA/LNA module 1260 and diversity PA/LNA module 1280. In this example, a transmit signal Tx0 SRS and a transmit signal Tx1 SRS can be sounded simultaneously providing a dual Tx SRS capability.

Figure 13:
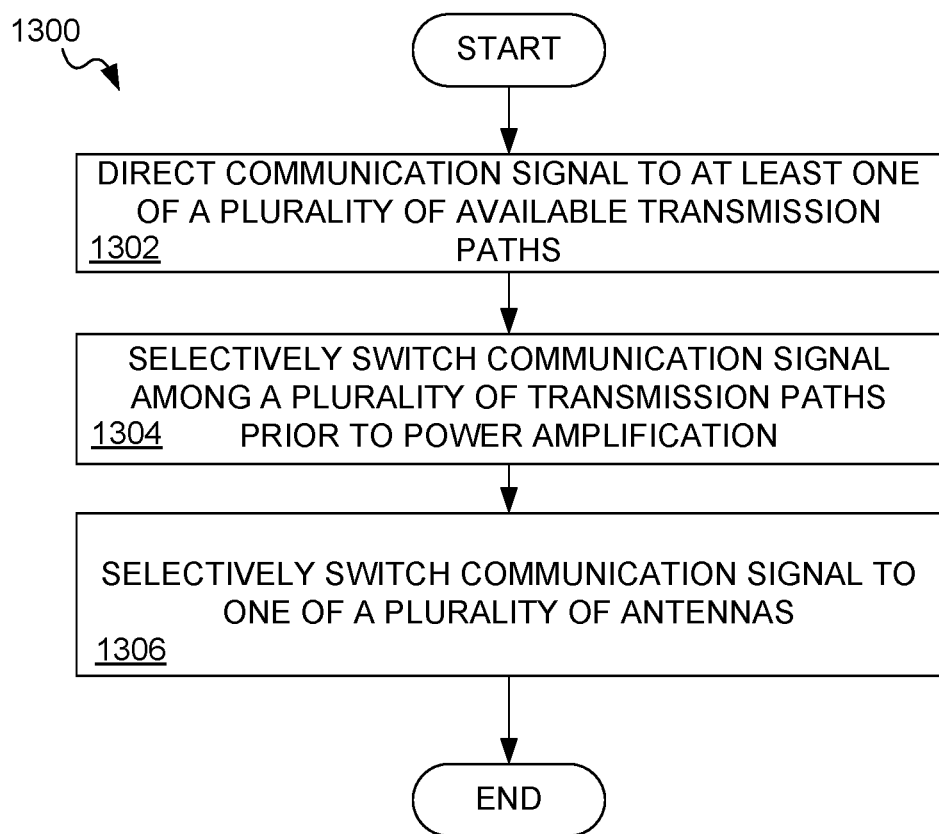
FIG. 13 is a flow chart describing an example of the operation of a method for signal processing.

FIG. 13 is a flow chart describing an example of the operation of a method 1300 for signal processing. The blocks in the method 1300 can be performed in or out of the order shown, and in some embodiments, can be performed at least in part in parallel.

In block 1302, a communication signal may be directed to at least one of a plurality of available transmission paths. For example, a signal (Tx0) on exemplary transmit path 822 may be directed to a driver amplifier 824, or a signal (Tx1) on exemplary transmit path 832 may be directed to a driver amplifier 834. Alternatively, a signal (Tx0) on exemplary transmit path 922 may be directed to a driver amplifier 904 or a driver amplifier 909, and/or a signal (Tx1) on exemplary transmit path 932 may be directed to a driver amplifier 953 or a driver amplifier 954.

In block 1304 a communication signal is selectively switched among a plurality of transmission paths prior to signal amplification by a power amplifier. For example, a signal (Tx0) may be switched from connection 842 to either connection 828 or connection 841. Similarly, a signal (Tx1) may be switched from connection 821 to either connection 841 or connection 828. Alternatively, a signal (Tx0) on exemplary transmit path 922, and/or a signal (Tx1) on exemplary transmit path 932 may be directed to the primary PA/LNA module 960 and/or to the diversity PA/LNA module 980. In an exemplary embodiment, the selective switching provides isolation for the communication signal. For example, at least approximately 30 dB to approximately 50 dB of isolation may be provided between the signal (Tx0) on connections 842 and 828, and the signal (Tx1) on connections 821 and 841. Alternatively, at least approximately 30 dB to approximately 50 dB of isolation may be provided between the signal (Tx0) on connection 941, and the signal (Tx1) on connection 944, or another connection.

In block 1306, a communication may be selectively switched to one of a plurality of antennas. For example, a signal (Tx0) may be switched to one of the antennas 816, 817 or 818 connected to the primary PA/LNA module 860 or to one of the plurality of antennas 811, 812 or 813 connected to the diversity PA/LNA module 880. Similarly, a signal (Tx1) may be switched to one of the antennas 816, 817 or 818 connected to the primary PA/LNA module 860 or to one of the plurality of antennas 811, 812 or 813 connected the diversity PA/LNA module 880. Alternatively, a signal (Tx0) may be switched to one of the antennas 916, 917 or 918 connected to the primary PA/LNA module 960 or to one of the plurality of antennas 911, 912 or 913 connected to the diversity PA/LNA module 980. Similarly, a signal (Tx1) may be switched to one of the antennas 916, 917 or 918 connected to the primary PA/LNA module 960 or to one of the plurality of antennas 911, 912 or 913 connected the diversity PA/LNA module 980.

Figure 14:
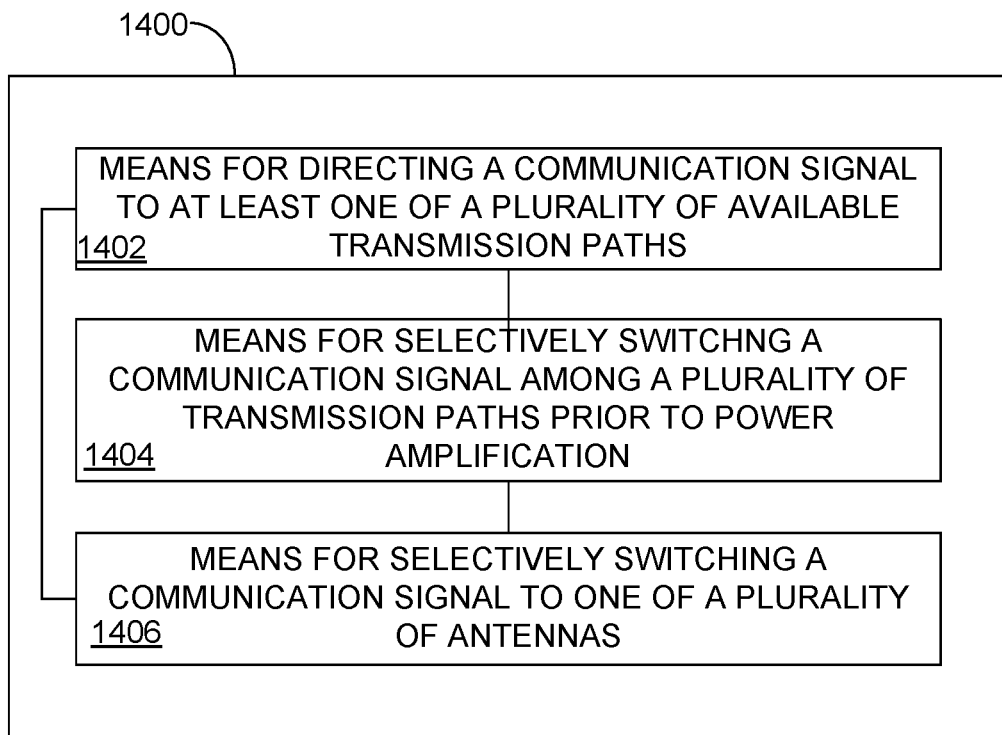
FIG. 14 is a functional block diagram of an apparatus for signal processing.

FIG. 14 is a functional block diagram of an apparatus for signal processing. The apparatus 1400 comprises means 1402 for directing a communication signal to at least one of a plurality of available transmission paths. In certain embodiments, the means 1402 for directing a communication signal to at least one of a plurality of available transmission paths can be configured to perform one or more of the functions described in operation block 1302 of method 1300 (FIG. 13). In an exemplary embodiment, the means 1402 for directing a communication signal to at least one of a plurality of available transmission paths may comprise circuitry configured to direct the signal (Tx0) on exemplary transmit path 822 to a driver amplifier 824, or a signal (Tx1) on exemplary transmit path 832 to a driver amplifier 834. For example, a modem and/or various connections or circuitry coupled to inputs of the driver amplifiers may be configured in this way. Alternatively, the means 1402 for directing a communication signal to at least one of a plurality of available transmission paths may comprise circuitry configured to direct a signal (Tx0) on exemplary transmit path 922 to a driver amplifier 904 or a driver amplifier 909, and/or to direct a signal (Tx1) on exemplary transmit path 932 to a driver amplifier 953 or a driver amplifier 954. For example, a modem and/or various connections or circuitry including the switch logic 901 coupled to inputs of the driver amplifiers may be configured in this way.

The apparatus 1400 also comprises means 1404 for selectively switching a communication signal among a plurality of transmission paths prior to signal amplification. The means 1404 for selectively switching a communication signal among a plurality of transmission paths prior to signal amplification can be configured to perform one or more of the functions described in operation block 1304 of method 1300 (FIG. 13). In an exemplary embodiment, the means 1404 for selectively switching a communication signal among a plurality of transmission paths prior to signal amplification may comprise the switch logic 855 configured to switch a communication signal among a plurality of transmission paths. Alternatively, the means 1404 for selectively switching a communication signal among a plurality of transmission paths prior to signal amplification may comprise the switch logic 915, the switch logic 956, and/or the switch logic 957 configured to direct a signal (Tx0) on exemplary transmit path 922, and/or a signal (Tx1) on exemplary transmit path 932 to the primary PA/LNA module 960 and/or to the diversity PA/LNA module 980. In an exemplary embodiment, means 1404 for selectively switching a communication signal among a plurality of transmission paths prior to signal amplification provides isolation for the communication signal. For example, at least approximately 30 dB to approximately 50 dB of isolation may be provided between the signal (Tx0) on connections 842 and 828, and the signal (Tx1) on connections 821 and 841. Alternatively, at least approximately 30 dB to approximately 50 dB of isolation may be provided between the signal (Tx0) on connection 941, and the signal (Tx1) on connection 944, or another connection.

The apparatus 1400 also comprises means 1406 for selectively switching a communication signal to one of a plurality of antennas. The means 1406 for selectively switching a communication signal to one of a plurality of antennas can be configured to perform one or more of the functions described in operation block 1306 of method 1300 (FIG. 13). In an exemplary embodiment, the means 1406 for selectively switching a communication signal to one of a plurality of antennas may comprise the switch 870 or the switch 890 configured to switch a communication signal among a plurality of antennas. Alternatively, the means 1406 for selectively switching a communication signal to one of a plurality of antennas may comprise the switch 970 or the switch 990 configured to switch a signal (Tx0) to one of the antennas 916, 917 or 918 connected to the primary PA/LNA module 960 or to one of the plurality of antennas 911, 912 or 913 connected to the diversity PA/LNA module 980. Similarly, the means 1406 for selectively switching a communication signal to one of a plurality of antennas may comprise the switch 970 or the switch 990 configured to switch a signal (Tx1) to one of the antennas 916, 917 or 918 connected to the primary PA/LNA module 960 or to one of the plurality of antennas 911, 912 or 913 connected the diversity PA/LNA module 980.

Implementation examples are described in the following numbered clauses:

1. A system for signal processing, comprising: a radio frequency integrated circuit (RFIC) having a plurality of available transmission paths, the RFIC configured to have at least a first communication signal on a first transmission path of the available transmission paths; a plurality of power amplifier/low noise amplifier (PA/LNA) modules selectively connected to the RFIC, each of the PA/LNA modules configured to connect to at least one respective antenna; and switch logic configured to connect the at least first communication signal to any of the plurality of PA/LNA modules prior to power amplification, while preventing the first communication signal from affecting or being affected by another communication signal on another of the plurality of available transmission paths.

2. The system of clause 1, wherein the system comprises a single transmit signal and a receive MIMO system.

3. The system of clause 1, wherein the system comprises a transmit MIMO system and a receive MIMO system.

4. The system of clause 1, wherein the at least first communication signal is switched among available transmission paths prior to power amplification and after mixing.

5. The system of clause 1, wherein the at least first communication signal is switched among available transmission paths prior to power amplification and prior to mixing.

6. The system of clause 1, wherein the at least first communication signal is switched among available transmission paths prior to power amplification and after driver amplification.

7. The system of any of clauses 1 through 6, wherein the at least first communication signal is a sounding reference signal (SRS).

8. The system of clause 5, further comprising baseband switch logic, wherein a local oscillator (LO) input and a baseband input are switched respectively prior to mixing.

9. The system of any of clauses 1 through 8, wherein the switch logic is located on the RFIC.

10. The system of any of clauses 1 through 9, wherein the plurality of available transmission paths extend to the plurality of PA/LNA modules.

11. The system of any of clauses 1 through 10, wherein the plurality of available transmission paths operate in an uplink carrier aggregation (ULCA) communication system.

12. The system of any of clauses 1 through 11, wherein the plurality of available transmission paths operate in a multiple subscriber identity module (MSIM) communication system.

13. The system of any of clauses 1 through 12, wherein there is no direct connection between the plurality of PA/LNA modules.

14. The system of clause 7, wherein the system is configured to transmit the sounding reference signal (SRS) using SRS carrier switching.

15. A method for signal processing, comprising: directing at least a first communication signal on a first transmission path of a plurality of available transmission paths; selectively connecting a plurality of power amplifier/low noise amplifier (PA/LNA) modules to the plurality of available transmission paths; and selectively connecting the at least first communication signal to any of the plurality of PA/LNA modules prior to power amplification, while preventing the first communication signal from affecting or being affected by another communication signal on another of the plurality of available transmission paths.

16. The method of clause 15, further comprising selectively switching the at least first communication signal among available transmission paths prior to power amplification and after mixing.

17. The method of clause 15, further comprising selectively switching the at least first communication signal among available transmission paths prior to power amplification and prior to mixing.

18. The method of clause 15, further comprising selectively switching the at least first communication signal among available transmission paths prior to power amplification and after driver amplification.

19. The method of clause 15, further comprising selectively switching the at least first communication signal among available transmission paths at baseband prior to mixing.

20. A device, comprising: means for directing at least a first communication signal on a first transmission path of a plurality of available transmission paths; means for selectively connecting a plurality of power amplifier/low noise amplifier (PA/LNA) modules to the plurality of available transmission paths; and means for selectively connecting the at least first communication signal to any of the plurality of PA/LNA modules prior to power amplification, while preventing the first communication signal from affecting or being affected by another communication signal on another of the plurality of available transmission paths.

21. The device of clause 20, further comprising means for selectively switching the at least first communication signal among available transmission paths prior to power amplification and after mixing.

22. The device of clause 20, further comprising means for selectively switching the at least first communication signal among available transmission paths prior to power amplification and prior to mixing.

23. The device of clause 20, further comprising means for selectively switching the at least first communication signal among available transmission paths prior to power amplification and after driver amplification.

24. The device of clause 20, further comprising means for selectively switching the at least first communication signal among available transmission paths at baseband prior to mixing.

25. A radio system architecture, comprising: a modem; a radio frequency integrated circuit (RFIC) connected to the modem; and a switch logic associated with the RFIC, the switch logic configured to selectively connect at least a first communication signal in the RFIC to any of a plurality of available power amplifier/low noise amplifier (PA/LNA) modules prior to power amplification.

26. The radio system architecture of clause 25, wherein the switch logic comprises a double pole double throw (DPDT, DP2T) architecture.

27. The radio system architecture of any of clauses 25 to 26, wherein the switch logic is located external to the RFIC.

28. The radio system architecture of any of clauses 25 to 26, wherein the switch logic is located internal to the RFIC.

29. The radio system architecture of clause 25, further comprising switch logic configured to switch a local oscillator signal.

30. The radio system architecture of clause 27, wherein the RFIC and at least one of the plurality of available power amplifier/low noise amplifier (PA/LNA) modules are mounted on a board, and wherein the switch logic comprises one or more discrete components mounted on the board.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A system for signal processing, comprising:
a radio frequency integrated circuit (RFIC) having a plurality of available transmission paths, the RFIC configured to have at least a first communication signal on a first transmission path of the available transmission paths;
a plurality of power amplifier and low noise amplifier (PA/LNA) modules selectively connected to the RFIC, each of the PA/LNA modules configured to connect to at least one respective antenna; and
switch logic configured to connect the at least first communication signal to any of the plurality of PA/LNA modules prior to power amplification, while preventing the first communication signal from affecting or being affected by another communication signal on another of the plurality of available transmission paths,
wherein the switch logic comprises baseband switch logic, wherein a local oscillator (LO) input and a baseband input are switched between the first transmission path and the another of the plurality of available transmission paths respectively prior to mixing.

2. The system of claim 1, wherein the system comprises a single transmit signal and a receive multiple input multiple output (MIMO) system.

3. The system of claim 1, wherein the system comprises a transmit multiple input multiple output (MIMO) system and a receive MIMO system.

4. The system of claim 1, wherein the at least first communication signal is a sounding reference signal (SRS).

5. The system of claim 4, wherein the system is configured to transmit the sounding reference signal (SRS) using SRS carrier switching.

6. The system of claim 1, wherein the switch logic is located on the RFIC.

7. The system of claim 1, wherein the plurality of available transmission paths extend to the plurality of PA/LNA modules.

8. The system of claim 1, wherein the plurality of available transmission paths operate in an uplink carrier aggregation (ULCA) communication system.

9. The system of claim 1, wherein the plurality of available transmission paths operate in a multiple subscriber identity module (MSIM) communication system.

10. The system of claim 1, wherein there is no direct connection between the plurality of PA/LNA modules.

11. A method for signal processing, comprising:
directing at least a first communication signal on a first transmission path of a plurality of available transmission paths;
selectively connecting a plurality of power amplifier and low noise amplifier (PA/LNA) modules to the plurality of available transmission paths; and
selectively connecting the at least first communication signal to any of the plurality of PA/LNA modules prior to power amplification, while preventing the first communication signal from affecting or being affected by another communication signal on another of the plurality of available transmission paths,
wherein the selectively connecting comprises switching a local oscillator (LO) input and the first communication signal between the first transmission path and the another of the plurality of available transmission paths respectively prior to mixing.

12. A device, comprising:
means for directing at least a first communication signal on a first transmission path of a plurality of available transmission paths;
means for selectively connecting a plurality of power amplifier and low noise amplifier (PA/LNA) modules to the plurality of available transmission paths; and
means for selectively connecting the at least first communication signal to any of the plurality of PA/LNA modules prior to power amplification, while preventing the first communication signal from affecting or being affected by another communication signal on another of the plurality of available transmission paths,
wherein the means for selectively connecting comprises means for switching a local oscillator (LO) input and the first communication signal between the first transmission path and the another of the plurality of available transmission paths respectively prior to mixing.

13. A radio system architecture, comprising:
a modem;
a radio frequency integrated circuit (RFIC) connected to the modem; and
a switch logic associated with the RFIC, the switch logic configured to selectively connect at least a first communication signal in the RFIC to any of a plurality of available power amplifier and low noise amplifier (PA/LNA) modules prior to power amplification,
wherein the switch logic is located external to the RFIC, wherein the RFIC and at least one of the plurality of available PA/LNA modules are mounted on a board, and wherein the switch logic comprises one or more discrete components mounted on the board.

14. The radio system architecture of claim 13, wherein the switch logic comprises a double pole double throw (DPDT, DP2T) architecture.

* * * * *